(12) United States Patent
Takahashi et al.

(10) Patent No.: US 11,575,302 B2
(45) Date of Patent: Feb. 7, 2023

(54) VIBRATION ACTUATOR AND MOBILE ELECTRONIC APPARATUS INCLUDING THE SAME

(71) Applicants: Yuki Takahashi, Tokyo (JP); Chikara Sekiguchi, Tokyo (JP); Yuki Otsuka, Tokyo (JP); Tomoya Ishitani, Tokyo (JP); Kazutaka Sakaguchi, Tokyo (JP); Shigenori Inamoto, Tokyo (JP)

(72) Inventors: Yuki Takahashi, Tokyo (JP); Chikara Sekiguchi, Tokyo (JP); Yuki Otsuka, Tokyo (JP); Tomoya Ishitani, Tokyo (JP); Kazutaka Sakaguchi, Tokyo (JP); Shigenori Inamoto, Tokyo (JP)

(73) Assignee: MINEBEA MITSUMI INC., Nagano (JP)

( * ) Notice: Subject to any disclaimer, the term of this patent is extended or adjusted under 35 U.S.C. 154(b) by 601 days.

(21) Appl. No.: 16/554,686

(22) Filed: Aug. 29, 2019

(65) Prior Publication Data

US 2020/0076287 A1  Mar. 5, 2020

(30) Foreign Application Priority Data

Aug. 29, 2018 (JP) .............................. JP2018-160807

(51) Int. Cl.
*H02K 33/06* (2006.01)
*B06B 1/04* (2006.01)

(52) U.S. Cl.
CPC .............. *H02K 33/06* (2013.01); *B06B 1/045* (2013.01); *H02K 2201/18* (2013.01)

(58) Field of Classification Search
CPC .... H02K 33/00–33/18; H02K 2201/18; B06B 1/045
See application file for complete search history.

(56) References Cited

U.S. PATENT DOCUMENTS

| | | | |
|---|---|---|---|
| 7,218,018 B2 * | 5/2007 | Hasegawa | H02K 33/16 310/12.33 |
| 2011/0101796 A1 | 5/2011 | Odajima et al. | |

(Continued)

FOREIGN PATENT DOCUMENTS

| | | | |
|---|---|---|---|
| JP | H08-051753 A | | 2/1996 |
| JP | 2002078310 A | * | 3/2002 |

(Continued)

*Primary Examiner* — Ramon M Barrera
(74) *Attorney, Agent, or Firm* — Brundidge & Stanger, P.C.

(57) ABSTRACT

A vibration actuator that cooperates with a coil and a magnet to vibrate a movable body with respect to a stationary body, including: the stationary body including the coil and a core around which the coil is wound; a shaft part; and the movable body including the magnet, the movable body being movably supported by the stationary body via the shaft part, wherein the core is disposed along an axial direction of the shaft part, and includes a core-side magnetic pole to be excited by energization to the coil, the magnet includes a magnet-side magnetic pole disposed so as to face the core-side magnetic pole with a gap therebetween, and the vibration actuator further includes a spring part elastically supporting the movable body with respect to the stationary body, linearly movably in the axial direction in a reciprocating manner, and rotationally movably about an axis in a reciprocating manner.

10 Claims, 18 Drawing Sheets

(56) References Cited

U.S. PATENT DOCUMENTS

2015/0137627 A1    5/2015    Katada et al.
2020/0001326 A1    1/2020    Takahashi

FOREIGN PATENT DOCUMENTS

| JP | 2002-176758 A | 6/2002 |
|----|---------------|--------|
| JP | 2004-194499 A | 7/2004 |
| JP | 4875133 B2 | 12/2011 |
| JP | 2015-095943 A | 5/2015 |
| JP | 2015112013 A | 6/2015 |
| JP | 2018-118233 A | 8/2018 |

\* cited by examiner

VIBRATION ACTUATOR AND MOBILE ELECTRONIC APPARATUS INCLUDING THE SAME

CROSS REFERENCE TO RELATED APPLICATIONS

This application is entitled to (or claims) the benefit of Japanese Patent Application No. 2018-160807, filed on Aug. 29, 2018, the disclosure of which including the specification, drawings and abstract is incorporated herein by reference in its entirety.

TECHNICAL FIELD

The present invention relates to a vibration actuator, and a mobile electronic apparatus including the same.

BACKGROUND ART

Conventionally, a vibration actuator has been known as a vibration generating source for notifying a user of an incoming call and the like at a mobile information terminal, such as a mobile phone, or as a vibration generating source for transmitting an operation touch on a touch panel and a realistic sensation of a playing apparatus, such as a controller or the like of a game machine, to fingers, hands and feet or the like (for example, see PTL 1).

A vibration actuator described in PTL 1 is formed to have a planar shape that slidably supports, by a shaft, a pivotally supported movable part. The vibration actuator is thus formed to have a planar shape, thereby facilitating reduction in size.

A vibration actuator described in PTL 2 includes a stator including a housing and a coil, and a movable element including a magnet and a weight that are disposed in the housing. According to cooperation between the coil and magnet, the movable element that is slidable against a shaft vibrates linearly with respect to the stator in a vibration direction. The coil is wound around the exterior of the movable part including the magnet.

PTL 3 describes an actuator having a VCM (Voice Coil Motor) principle that includes a flat coil and a flat magnet arranged above the flat coil, the coil and the magnet being arranged to face each other.

The movable element in each of the vibration actuators is slidably provided for the shaft arranged in the lateral direction in the rectangular plate-shaped housing, and is elastically supported by springs in a manner slidable in the lateral direction.

CITATION LIST

Patent Literature

PTL 1
Japanese Patent Application Laid-Open No. 2015-095943
PTL 2
Japanese Patent Application Laid-Open No. 2015-112013
PTL 3
Japanese Patent No. 4875133

SUMMARY OF INVENTION

Technical Problem

Incidentally, in a case where a vibration actuator is applied to a mobile electronic apparatus, such as a mobile terminal or a wearable terminal, and is mounted as an incoming call notification function device or the like that notifies a wearing user of an incoming call through vibrations, it is required to provide the user with vibrations that provide a sufficient feeling without variation.

Each of the vibration actuators in PTLs 1 to 3 applies vibrations by driving in a reciprocating manner in a uniaxial direction. Consequently, even if a mobile terminal provided with a vibration actuator is stored in a pocket of clothes or the like to be arranged adjacent to the body surface of the user, the vibration actuator cannot provide the user with a sufficient feeling in a certain arrangement state of the vibration direction and the body surface. Thus, a configuration is expected that can provide a user with a sufficient feeling in the state of simply being stored in a pocket of clothes for adjacent arrangement to the body surface.

A possible example of the configuration capable of providing a user with a sufficient feeling is a configuration where a shaft part against which a movable body slides is arranged vertically to the body surface, and provides the movement of the movable body directly to the body surface.

Unfortunately, this configuration requires the housing to have a large thickness in order to secure a movable region of the movable body. A mobile electronic apparatus itself, such as a smartphone, serving as a mounting target is also thickened accordingly.

An object of the present invention is to provide a vibration actuator and a mobile electronic apparatus that can favorably apply a sufficient vibrations while facilitating reduction in size.

Solution to Problem

In order to achieve the above mentioned object, a vibration actuator according to the present invention is a vibration actuator that cooperates with a coil and a magnet to vibrate a movable body with respect to a stationary body, the vibration actuator including:

the stationary body including the coil and a core around which the coil is wound;

a shaft part; and the movable body including the magnet, the movable body being movably supported by the stationary body via the shaft part, in which the core is disposed along an axial direction of the shaft part and includes a core-side magnetic pole to be excited by energization to the coil, the magnet includes a magnet-side magnetic pole disposed so as to face the core-side magnetic pole with a gap therebetween, and the vibration actuator further includes a spring part elastically supporting the movable body with respect to the stationary body, linearly movably in the axial direction in a reciprocating manner, and rotationally movably about an axis in a reciprocating manner.

A mobile electronic apparatus of the present invention is provided with the vibration actuator having the configuration described above.

Advantageous Effects of Invention

The present invention can favorably apply sufficient vibrations while facilitating reduction in size.

DESCRIPTION OF EMBODIMENTS

Hereinafter, embodiments of the present invention are described in detail with reference to the accompanying drawings.

Embodiment 1

Figure 1:
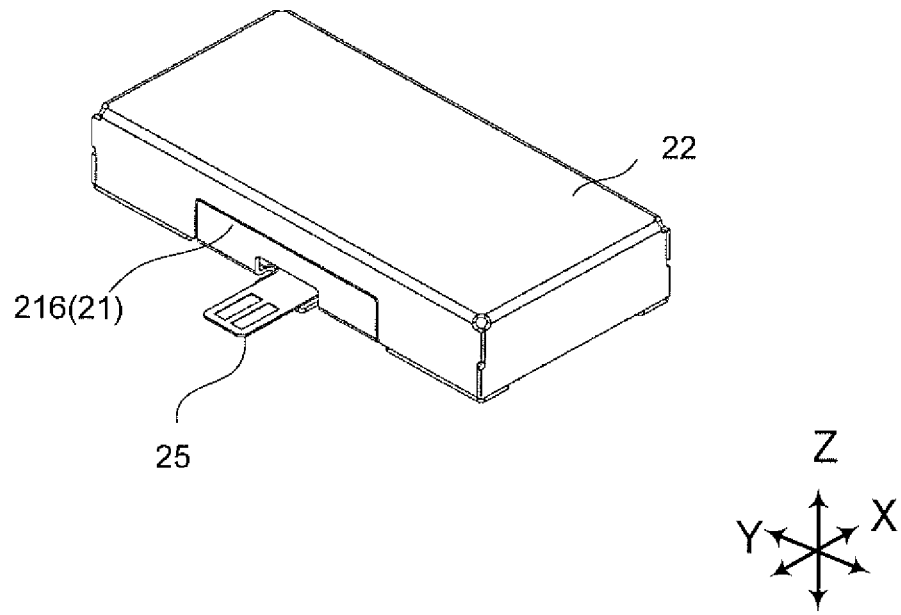
FIG. 1 is an appearance perspective view of a vibration actuator of Embodiment 1 according to the present invention.
Figure 2:
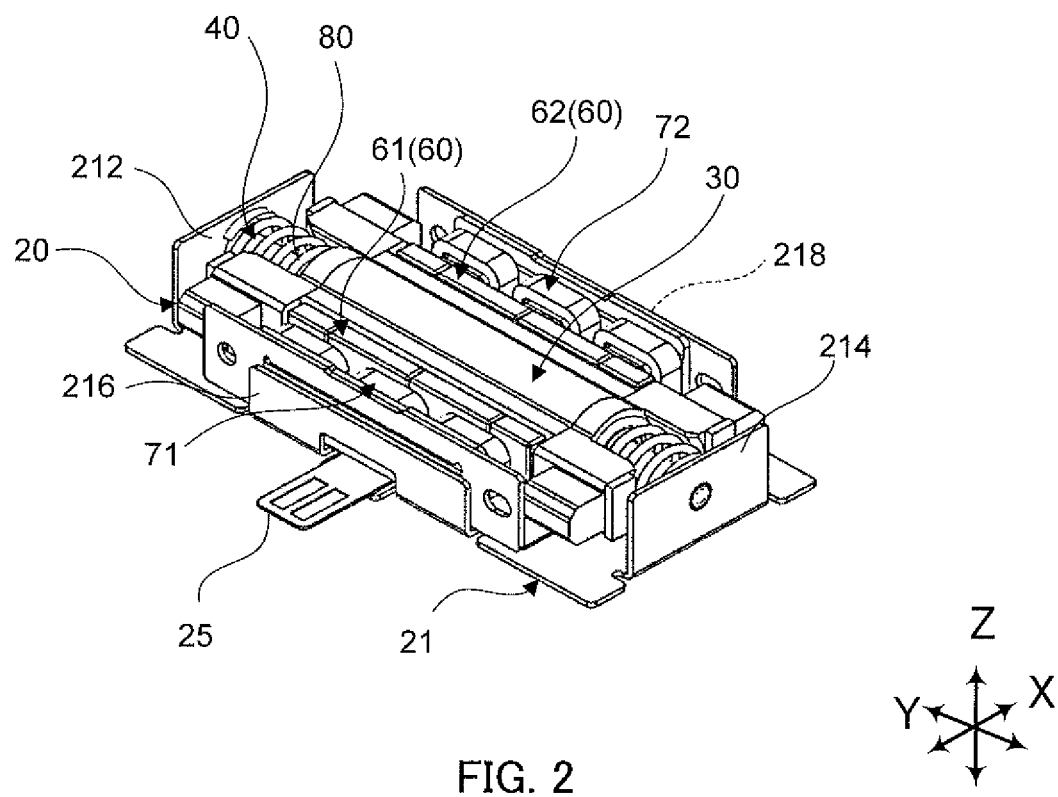
FIG. 2 is a perspective view depicting an internal configuration of the vibration actuator of Embodiment 1 according to the present invention.
Figure 3:
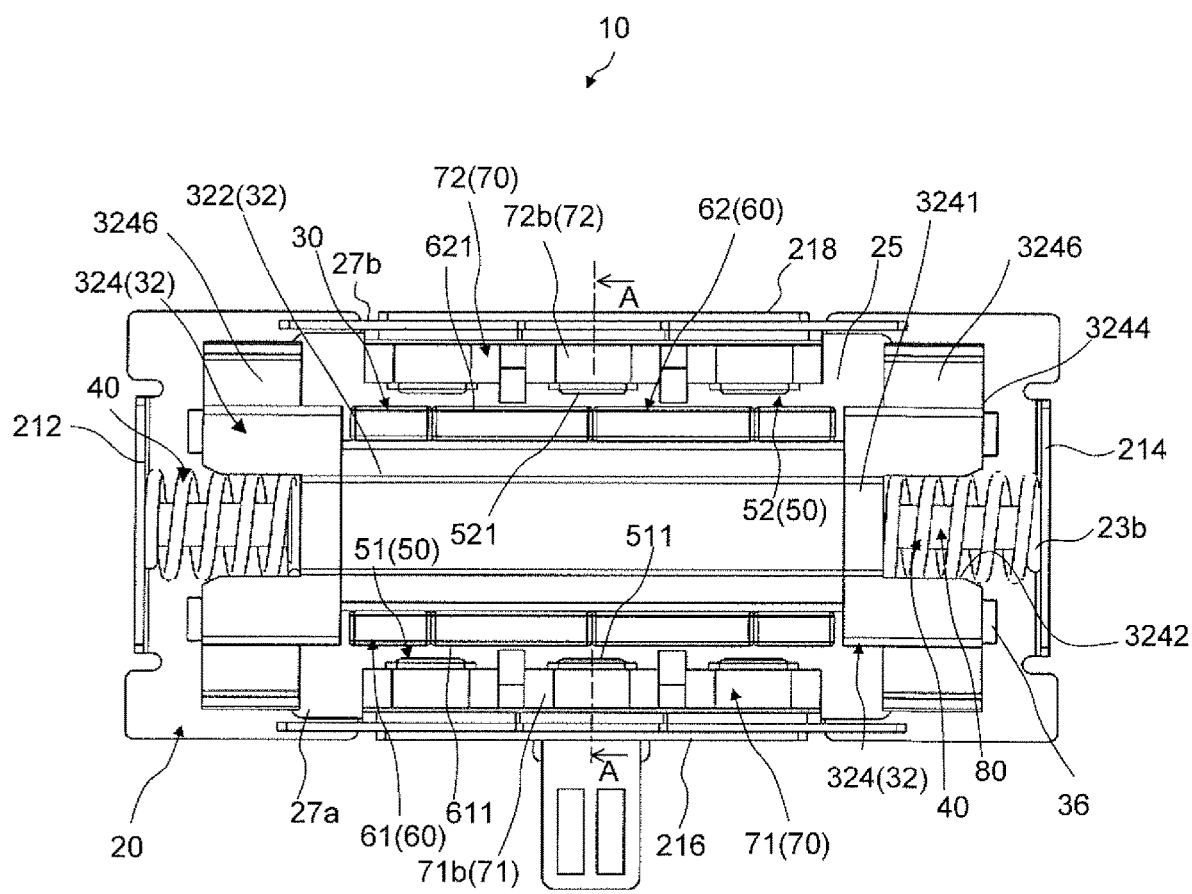
FIG. 3 is a plan view depicting the internal configuration of the vibration actuator.
Figure 4:
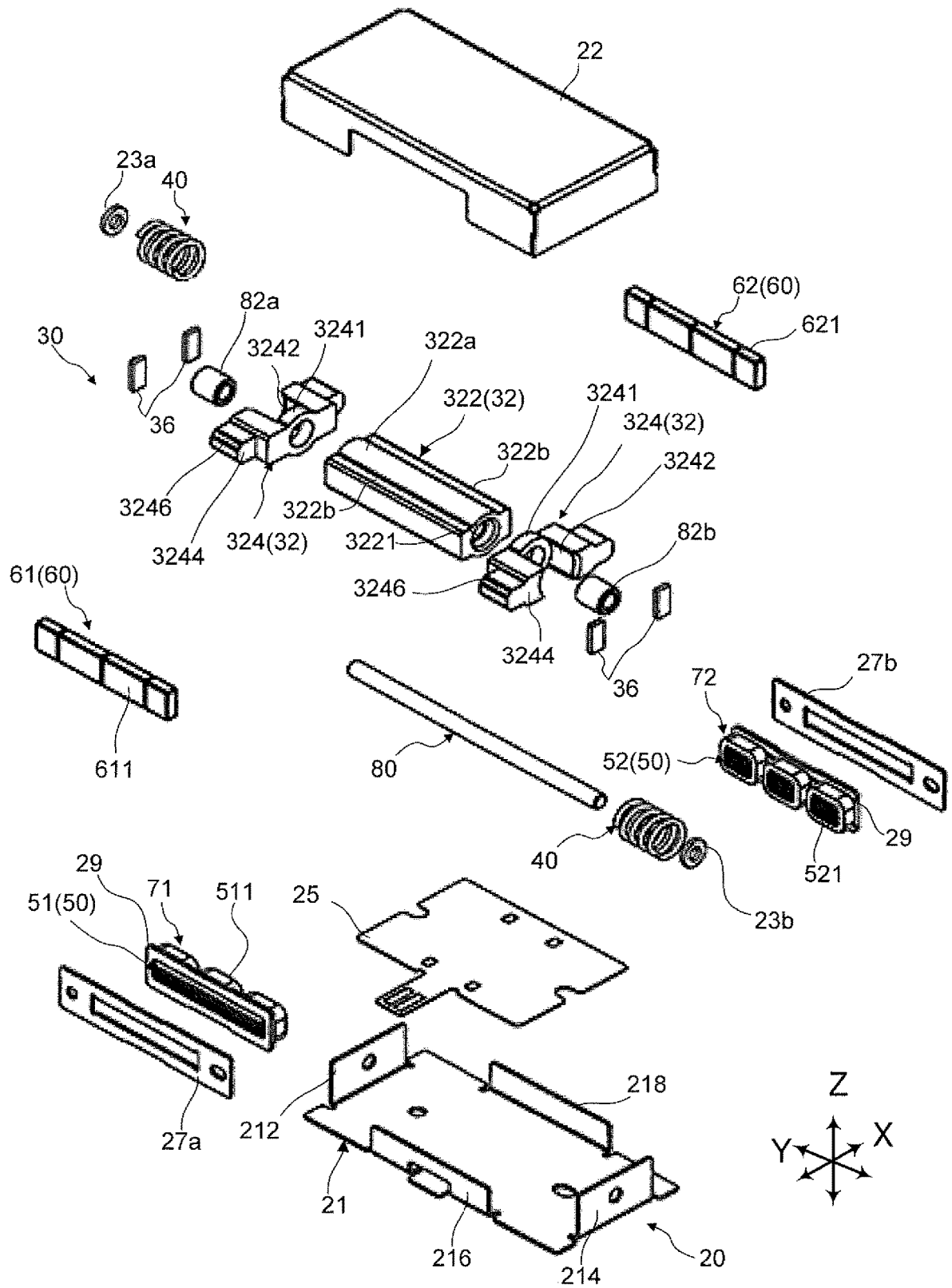
FIG. 4 is an exploded perspective view of the vibration actuator.

FIG. 1 is an appearance perspective view of a vibration actuator of Embodiment 1 according to the present invention. FIG. 2 is a perspective view depicting an internal configuration of the vibration actuator of Embodiment 1 according to the present invention. FIG. 3 is a plan view depicting the internal configuration of the vibration actuator. FIG. 4 is an exploded perspective view of the vibration actuator.

In addition to FIGS. 1 to 4, FIGS. 5 to 19 indicate a linear reciprocating movement direction along a shaft part of the movable body in a vibration actuator as the Y direction (the left and right direction of the vibration actuator) for the sake of convenience, in a case of description of the vibration actuator in each embodiment. The Y direction corresponds to the lateral direction. Furthermore, the rotational reciprocating movement direction about the shaft part of the movable body is indicated as the Z direction (the thickness direction of vibration actuator 10) for the sake of convenience. Description is made assuming that the X direction orthogonal to the Y direction and Z direction is the front and rear direction.

<Overall Configuration of Vibration Actuator 10>

Vibration actuator 10 depicted in FIG. 1 has a planar shape with a height (in the Z direction, corresponding to the thickness) shorter than the lengths in the depth (the X direction; the front and rear direction) and lateral direction (the Y direction; the left and right direction).

As depicted in FIGS. 1 to 3, vibration actuator 10 of this embodiment includes stationary body 20, shaft part 80, movable body 30 supported movably with respect to stationary body 20 via shaft part 80, and a spring part that flexibly supports movable body 30 with respect to stationary body 20 so as to be linearly movable in an axial direction in a reciprocating manner and rotationally movable about an axis in a reciprocating manner.

Movable body 30 includes magnets 60 (61 and 62), and linearly moves in the reciprocating manner along the axial direction of shaft part 80 and rotationally moves in the reciprocating manner about shaft part 80, through cooperation between magnets 60 and coil parts 70 (71 and 72) that are provided for stationary body 20 and are wound around cores 50 (51 and 52).

Vibration actuator 10 of this embodiment is provided with magnets 61 and 62 at the opposite sides of movable body 30 along the axial direction so as to allow the axis of shaft part 80 to intervene therebetween, and is further provided with cores 51 and 52 at positions allowing these cores to face respective magnets 61 and 62 with intervention of air gaps, the cores 51 and 52 having protrusions (magnetic pole parts) around which the coils of respective coil parts 71 and 72 are wound.

Magnets 61 and 62, and cores 51 and 52 around which coil parts 71 and 72 are wound are arranged such that their magnetic poles (the magnetic poles (hereinafter, also called "magnet-side magnetic poles") 611 and 621 of magnets 61 and 62, and the magnetic poles (hereinafter, also called "core-side magnetic poles") 511 and 521 of cores 51 and 52) can face each other.

Specifically, magnetic poles 611 and 621 of magnets 61 and 62 are arranged facing away from each other in a direction orthogonal to the axis of shaft part 80 (front and rear directions; opposite in the X direction); magnetic poles 511 and 521 of cores 51 and 52 are arranged to face thereto, respectively. Magnets 61 and 62, and cores 51 and 52, around which respective coil parts 71 and 72 are wound, constitute a magnetic force generation part. The magnetic force generation part functions as magnetic springs provided by magnetic attractive forces on the opposite sides (the X direction; the front and rear direction) of shaft part 80. The magnetic attractive forces occur symmetrically with respect to the center of shaft part 80 in the front and rear direction. During no energization to coil parts 71 and 72, movable body 30 is attracted toward the opposite sides by the magnetic attractive forces caused on the opposite sides, and the forces are cancelled to achieve balance. Consequently, movable body 30 is prevented from rotating, and is held at a position that achieves a horizontal state and serves as a reference position.

In this embodiment, movable body 30 includes, in addition to the magnetic springs, metal springs 40 that elastically support shaft part 80 via metal springs 40 such that shaft part 80 can return when moving in the axial direction of shaft part 80.

The magnetic springs and metal springs 40 function as the spring part to elastically support movable body 30 in a reciprocating manner about the axis and in the axial direction in a state of restricting rotation about the axis and the movement in the axial direction.

Vibration actuator 10 is specifically described.

In vibration actuator 10 of this embodiment, movable body 30 is provided with bearings 82a and 82b which fix shaft part 80 to stationary body 20 and into which shaft part 80 is inserted.

<Stationary Body 20 of Vibration Actuator 10>

Stationary body 20 includes base 21, cover 22, spring holders 23a and 23b, coil parts 71 and 72, cores 51 and 52, around which respective coil parts 71 and 72 are wound, and power supply part 25.

Base 21 constitutes a rectangular plate-shaped bottom surface part. Shaft part 80 and cores 51 and 52 are fixed to base 21. Base 21, together with rectangular box-shaped cover 22, constitutes a housing. Movable body 30 is arranged in the housing. The housing functions as a hollow electronic shield.

In this embodiment, shaft fixation walls 212 and 214 are vertically provided on base 21 from sides apart from each other in the lateral direction (Y direction) among four sides of the bottom main body. Shaft part 80 is provided across shaft fixation walls 212 and 214. On base 21, core fixation walls 216 and 218 are vertically provided from sides apart from each other in the front and rear direction (X direction) among the four sides.

Cores 51 and 52 are fixed to respective core fixation walls 216 and 218.

Shaft part 80 is disposed along the lateral direction of base 21 and at the center in the front and rear direction of base 21, and is supported by shaft fixation walls 212 and 214.

Shaft part 80 is arranged so as to be inserted through movable body 30 via bearings 82a and 82b.

At the opposite ends of shaft part 80, metal springs 40 are fixed to shaft fixation walls 212 and 214 via respective spring holders 23a and 23b, in a state of clamping movable body 30 in the axial direction.

Shaft part 80 may be fixed to shaft fixation walls 212 and 214 by being press-fit into fixation holes of spring holders 23a and 23b or by being inserted thereinto and subsequently fixed with adhesion or the like. Bearings 82a and 82b allow shaft part 80 to be slidably inserted thereinto, and may be copper, iron or iron-copper based oil retaining bearings, or of a magnetic material.

In this embodiment, cores 51 and 52 are made of a magnetic material, are disposed to allow the axis of shaft part 80 to intervene therebetween, and are formed to have the same shapes symmetrical with respect to the center of shaft part 80.

In this embodiment, cores 51 and 52 respectively have multiple protrusions whose distal end surfaces serve as core-side magnetic poles 511 and 521. In this embodiment, the coils of coil parts 71 and 72 are wound on the outer peripheries of protrusions of cores 51 and 52 via bobbin parts 29. Specifically, each of cores 51 and 52 is formed by stacking rectangular metal plates in a rectangular parallelepiped shape, and forming slits on one side along the longitudinal direction of the rectangular parallelepiped to divide it into three parts and have an E-shape in a plan view where protrusions are arranged on one surface side. As for cores 51 and 52, the protrusions constituting core-side magnetic poles 511 and 521 may be formed by arranging block parts independent from each other, at bobbin parts 29.

Core-side magnetic poles 511 and 521 are arranged to be laid in the lateral direction. Core-side magnetic poles 511 and 521 are arranged at positions opposite to each other and, preferably, arranged so as to be parallel to shaft part 80 and core fixation walls 216 and 218 of base 21, and be parallel to magnetic poles 611 and 621 of magnets 61 and 62, respectively. Cores 51 and 52 may be made of electromagnetic stainless steel, sintered material, MIM (metal injection molding) material, stacked steel plates, electrogalvanized steel plates (SECC), or the like.

Coil parts 71 and 72 wound around cores 51 and 52 are made of copper wire, for example. When coil parts 71 and 72 are excited by allowing current to flow therethrough, the center protrusions of cores 51 and 52, and the opposite protrusions between which the center protrusions intervene are excited with opposite polarities.

Preferably, at cores 51 and 52, core-side magnetic poles 511 and 521 at the protrusions facing each other are excited to have different polarities. For example, in this embodiment, cores 51 and 52 each have three protrusions. Accordingly, coil parts 71 are wound such that if core-side magnetic pole 511 at the center protrusion of core 51 has an N-pole, core-side magnetic poles 511 at the protrusions on both sides of the center protrusion have S-poles. In conformity therewith, as for core 52, coil parts 72 are wound such that core-side magnetic pole 521 at the center protrusion of core 52 has an S-pole, the magnetic poles at protrusions, with the center protrusion intervening therebetween, have N-poles.

Stiffeners 27a and 27b are arranged on surfaces of cores 51 and 52 that are respectively on the opposite sides of the facing surfaces. Cores 51 and 52, around which respective coil parts 71 and 72 are wound, are reinforced by stiffeners 27a and 27b, respectively.

In coil part 71, a single coil wire constitutes three coils wound around core 51 (specifically, the respective protrusions of cores 51). In coil part 72, a single coil wire constitutes three coils wound around cores 52 (specifically, the respective protrusions of cores 52). Such configurations of coil parts 71 and 72 allow the magnetic circuit configurations of vibration actuator 10 to function effectively. Specifically, in cores 51 and 52, the directions of winding the coil wire around the center protrusion and around the protrusions on both sides of the center protrusion are directions different from each other. Alternatively, as for coil parts 71 and 72, different coil wires may be wound for the respective coils, and the center protrusions and the protrusions on both the sides, with the center protrusion intervening therebetween, are excited with different polarities.

Coil parts 71 and 72 are each connected to power supply part 25. Coil parts 71 and 72 are supplied with power by power supply part 25, thereby exciting the protrusions. Specifically, coil parts 71 and 72 excite, through energized coils, the center protrusions, and the protrusions on both sides of the center protrusions, with each center protrusion intervening therebetween, at cores 51 and 52, so as to form different magnetic poles.

Power supply part 25 is a board that supplies power to coil parts 71 and 72, and may include a board connected to an external power source, for example, a flexible circuit board (FPC: flexible printed circuits) or the like. Power supply part 25 is disposed on base 21.

<Movable Body 30>

As depicted in FIGS. 1 to 3, movable body 30 is arranged movable in the extending direction of shaft part 80 and the direction about the axis of shaft part 80, between cores 51 and 52 in the housing of stationary body 20 in a state of allowing movable body 30 to intervene between metal springs 40.

In this embodiment, movable body 30 includes magnets 61 and 62, weight part 32 to which magnets 61 and 62 are attached, and bearings 82*a* and 82*b* which are attached to weight part 32 and into which shaft part 80 is inserted.

Bearings 82*a* and 82*b* are respectively attached to the centers of the opposite ends of weight part 32 that are apart from each other in the lateral direction, that is, the longitudinal direction. Magnets 61 and 62 are attached to the side surfaces of weight part 32 opposite to the respective cores 51 and 52.

Weight part 32 increases the mass of movable body 30 itself to increase vibrations. Preferably, weight part 32 is made of, for example, a metal material having a specific gravity of five or higher, such as any of types of iron including SECC, an alloy with a principal component of iron, bronze or copper, sintered material, or MIM (metal injection molding) material.

Weight part 32 is suitably made of, for example, a high specific gravity metal material, such as tungsten or a tungsten alloy (preferably, with a specific gravity of 10 or higher; more preferably, with a specific gravity of 11 or higher). In this embodiment, weight part 32 is made mainly of tungsten. For example, a rough indication of specific gravity is SECC: 7.8, Nd sintered magnet: 7.4 to 7.6, copper: 8.9, tungsten: 16 to 19.

The opposite side parts of weight part 32, which allow shaft part 80 to intervene therebetween and extend in the axial direction of shaft part 80, have a smaller thickness in the rotational direction (Z direction) than a part (for example, trunk part 322) into which shaft part 80 is inserted. The opposite side parts of weight part 32 are parts of weight part 32 that are farthest in the front and rear direction, that is, the X direction, from shaft part 80. The thin parts prevent movable body 30 from colliding with base 21 and the ceiling surface of cover 22, and avoid interference of base 21 and cover 22 with movable body 30, even when rotating about shaft part 80 in a reciprocating manner.

Specifically, weight part 32 includes: trunk part 322 having insertion hole 3221 into which shaft part 80 is inserted at the center in the front and rear direction; and extension parts 324 and 324 provided at the opposite ends apart from each other in the axial direction of trunk part 322.

Trunk part 322 is an elongated member extending in the axial direction, and includes cylindrical part 322*a* where insertion hole 3221 is formed, and linear protrusion parts 322*b* each protruding in the front and rear direction from the outer periphery of cylindrical part 322*a*.

Linear protrusion parts 322*b* are formed to extend in the axial direction along the extending direction of cylindrical part 322*a*. The thicknesses of linear protrusion parts 322*b* in the Z direction are each smaller than the length of trunk part 322 in the Z direction. Magnets 61 and 62 are respectively attached to distal end surfaces of linear protrusion parts 322*b* that are disposed at positions protruding in the front and rear direction, such that magnets 61 and 62 have magnetization directions oriented in the front and rear direction.

Linear protrusion parts 322*b*, together with magnets 61 and 62 and extension portions 3244 of extension parts 324, constitute the opposite side parts of movable body 30.

Extension parts 324 are provided to protrude in the front and rear direction farther than linear protrusion parts 322*b* of trunk part 322 (the opposite sides of cylindrical part 322*a*; the X direction).

Extension parts 324 are disposed at positions such that magnetic circuit parts of cores 51 and 52 and magnets 61 and 62, which face each other, intervene therebetween at external sides in the axial direction, in a rectangular region in the housing. That is, vibration actuator 10 has a configuration that reduces the gap as much as possible to facilitate achieving a compact size in the housing formed by covering base 21 with cover 22.

Figure 5:
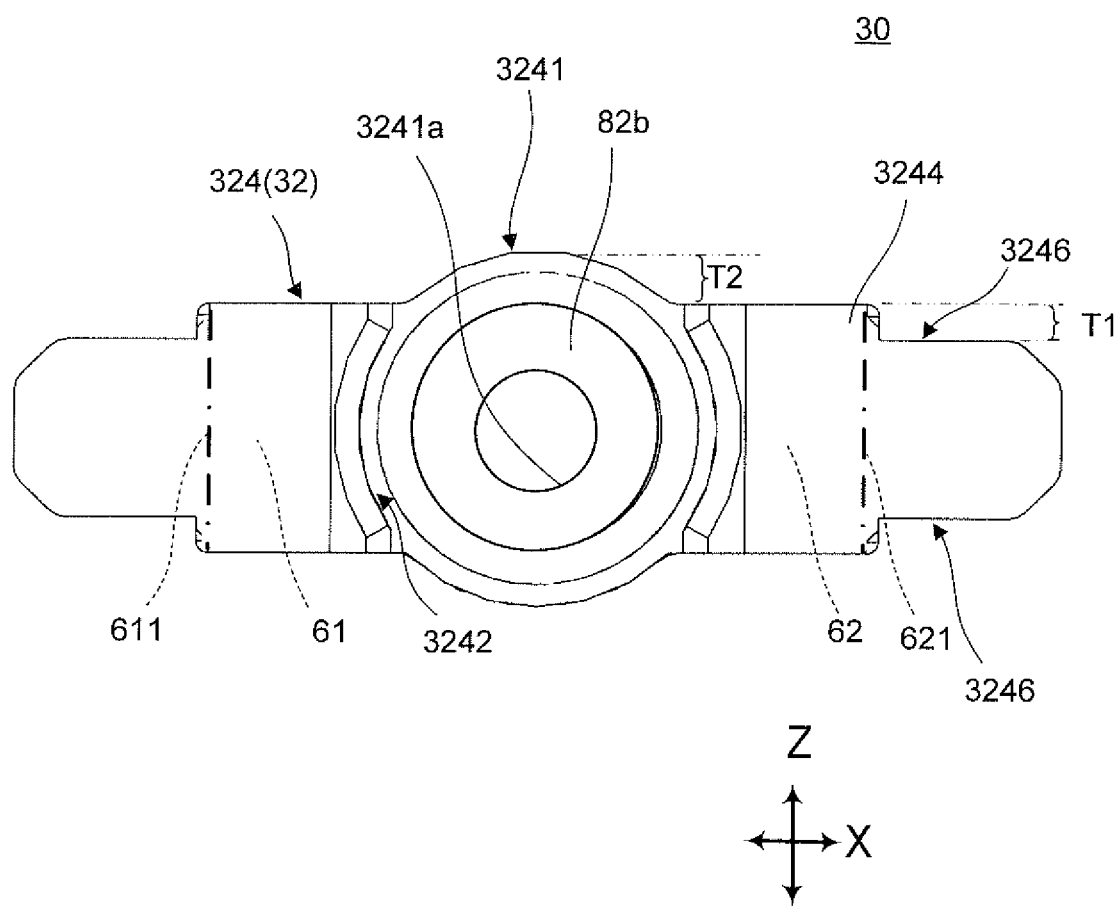
FIG. 5 is a right side view of a movable body.

FIG. 5 is a right side view of movable body 30.

In this embodiment, extension parts 324 have a function as of a weight of movable body 30, and a function of being connected to metal springs 40.

Extension parts 324 include extension portions 3244 that are parts having the maximum amplitude in the X axis direction when weight part 32 rotates about shaft part 80.

As depicted in FIGS. 3 to 5, extension portions 3244 of extension parts 324 are provided to protrude, in the X direction orthogonal to shaft part 80, from extension main part 3241 fixed to the end surfaces of trunk part 322.

Extension main parts 3241 are disposed at positions overlapping trunk part 322 and magnets 61 and 62 in the axial direction. Opening 3241*a* communicating with insertion hole 3221 of trunk part 322 is formed in each extension main part 3241 at the center.

Extension main part 3241 is provided with extension portions 3244 so as to allow opening 3241*a* to intervene therebetween, by joining individual components or by protrusion of an integral component. Extension main part 3241, together with extension portions 3244 at both the ends, forms a concave receiver part 3242 depressed outward in the axial direction. The receiver part 3242 internally receives an end of metal spring 40 and is thus connected to metal spring 40.

End surfaces of extension portions 3244 outward in the axial direction (Y direction) are provided with cushion materials 36 that avoid direct collision with shaft fixation walls 212 and 214 when movable body 30 moves in the axial direction. Cushion materials 36 are formed of, for example, soft material, such as elastomer, rubber, resin, or porous flexible material (for example, a sponge).

Extension portion 3244 has relief portions 3246 at parts that respectively face base 21 and the ceiling surface of cover 22 apart from each other in the Z direction, and are near to the distal end extending in the front and rear direction.

Relief portions 3246 are provided so as to be apart from base 21 and the ceiling surface of cover 22, which these portions face, by a length T1, from proximal surfaces of extension portion 3244 near to shaft part 80, in a normal state that is a state with no energization.

Accordingly, when movable body 30 rotationally moves about shaft part 80 in a reciprocating manner, this body does not come into contact with the housing (specifically, base 21 and the ceiling surface of cover 22) even with extension portions 3244 having a large amplitude, thereby avoiding interference with the housing. Consequently, during reciprocating rotational movement of movable body 30, movable body 30 does not interfere with the housing and causes no sound.

At trunk part 322 of weight part 32 of movable body 30, linear protrusion parts 322b, which protrude in the front and rear direction from cylindrical part 322a, each have a smaller thickness in the up-down direction than cylindrical part 322a.

Magnets 61 and 62 are fixed to the distal ends of linear protrusion parts 322b. Linear protrusion parts 322b, together with magnets 61 and 62 and extension portions 3244 of extension parts 324, constitute the opposite side parts of movable body 30.

As described above, the opposite side parts of weight part 32, which allow shaft part 80 to intervene therebetween in the X direction and extend in the axial direction of shaft part 80 (for example, the Y direction), have a smaller thickness in the rotational direction (Z direction) than a part (for example, trunk part 322) into which shaft part 80 is inserted (thinner by the length T2 depicted in FIG. 5).

Consequently, when movable body 30 rotationally moves about shaft part 80 as the axial center, the opposite side parts of weight part 32 can rotationally move in a reciprocating manner with a large amplitude without contact with the housing.

Bearings 82a and 82b allow shaft part 80 to be inserted thereinto, and are formed of, for example, sintered sleeve bearings. Bearings 82a and 82b are provided at weight part 32 such that shaft part 80 can be positioned on the central axis of weight part 32. In this embodiment, the bearings are concentrically fixed to the opposite ends of through-holes 32a penetrating on the central axis of weight part 32, in drilled portions formed in openings 3241a of extension parts 324.

Metal springs 40 are arranged so as to elastically support weight part 32 in the axial direction. That is, metal springs 40 urge movable body 30, which is arranged on shaft part 80, via bearings 82a and 82b so as to position at the center in the longitudinal direction (a reference position in the linear direction).

Accordingly, movable body 30 is urged so as to be positioned at the center in the longitudinal direction that is the lateral direction, by the function of metal springs 40 in addition to the function of magnetic springs when no power is supplied to coil parts 71 and 72.

Metal springs 40 are cylindrical compression coil springs (hereinafter called "cylindrical coil springs"), and are made of helically formed material. Accordingly, a rotational force occurs during compression, and a torque in a helical direction, that is, a torque appearing in the rotational direction ("torque in the rotational direction") occurs at each metal spring 40. It is effective that metal springs 40 are arranged in the same wiring direction on the opposite sides in the extending direction of shaft part 80 at movable body 30.

Figure 6:
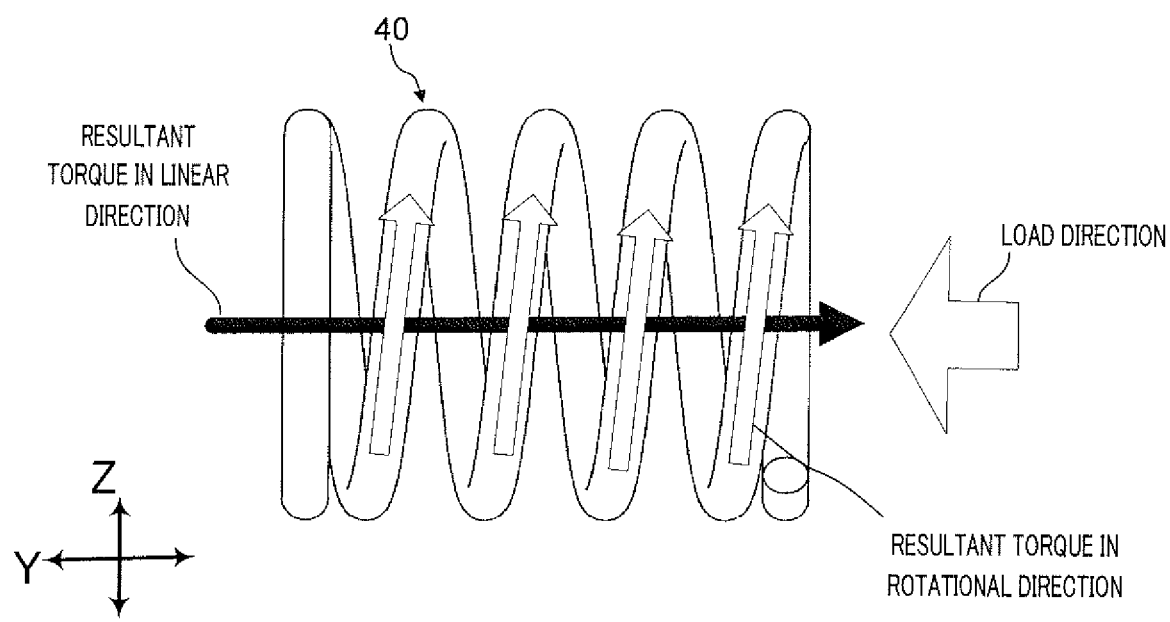
FIG. 6 illustrates a torque in the rotational direction generated by a metal spring.

FIG. 6 illustrates the torque in the rotational direction generated by metal spring 40.

During movable body 30 being driven, loads are applied to metal springs 40 from movable body 30, and torques in the rotational direction about the axis occur as depicted in FIG. 6. Accordingly, movable body 30 can rotationally move about the axis. In this embodiment, it is configured such that the opposite ends of metal springs 40 are fixed to shaft fixation walls 212 and 214 or spring holders 23a and 23b and to weight part 32, and the resultant torques in the rotational direction are transmitted to movable body 30.

At least one of the opposite ends of each metal spring 40 is fixedly joined to a connection target. For example, the opposite ends of metal springs 40 are fixed by adhesion, welding or the like. Accordingly, metal springs 40 do not slide about the axis at installation points, and can stably transmit the resultant torques in the rotational direction to movable body 30. Even without fixation of the opposite ends of metal spring 40 by adhesion, welding or the like, the resultant rotational torque can be stable and be transmitted to movable body 30 with no problem only if fixation is achieved by friction between shaft fixation wall 212 and weight part 32 and metal spring 40.

Figure 7:
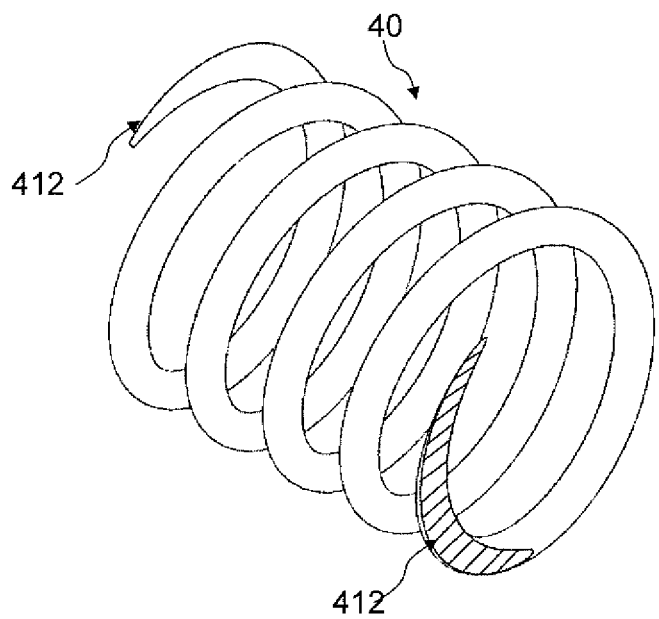
FIG. 7 is a perspective view depicting a modification example of a metal spring of the vibration actuator.

As depicted in FIG. 7, metal springs 40 may be provided with flat planar portions 412 orthogonal to the axial direction at the opposite ends so as to increase contact areas with shaft fixation walls 212 and 214 or spring holders 23a and 23b and weight part 32. Planar portions 412 at the opposite ends of metal springs 40 are parts that are in contact with shaft fixation walls 212 and 214 of stationary body 20 or spring holders 23a and 23b and with weight part 32 of movable body 30. Planar portions 412 of metal springs 40 are formed to have flat surfaces orthogonal to the axial directions of metal springs 40 or to have substantially flat surfaces.

According to this configuration, the arrangement of metal springs 40 between shaft fixation walls 212 and 214 or spring holders 23a and 23b and weight part 32 brings planar portions 412 at the opposite ends into planar contact with shaft fixation walls 212 and 214 or spring holders 23a and 23b and weight part 32 to press them. Accordingly, metal springs 40 come into a state of being connected to stationary body 20 and movable body 30. Consequently, even without fixation of the opposite ends of metal springs 40 to shaft fixation walls 212 and 214 or spring holders 23a and 23b and to weight part 32, metal springs 40 are in a state of being connected to both the elements, and can generate torques in the rotational direction, transmit the torques to movable body 30 and drive movable body 30 in the rotational direction.

Here, since the ends of the cylindrical coil springs serving as the metal springs have helical spring shapes, the end shapes are oblique. During rotational driving, the ends are assembled obliquely with attachment sites. There is a possibility that the engagement serves as a cause of variation in assembling. During rotational driving, the inner peripheries of the springs may come into contact with shaft part 80 in some cases.

On the contrary, according to this embodiment, planar portions 412 are provided at the ends of the cylindrical coil springs, which are an example of metal springs 40. Accordingly, the wiring central axes of the cylindrical coil springs can be coincide with the axis of shaft part 80. The coincidence reduces variation, and allows metal springs 40 to be assembled with no contact with shaft part 80.

In this embodiment, metal springs 40 are cylindrical coil springs. Through use of rotational forces caused during movement of the cylindrical coil springs in the linear direction along with movement of movable body 30 in the linear direction, movable body 30 is simultaneously driven in the rotational direction. This configuration negates the need to additionally add components for rotationally driving movable body 30, and allows movable body 30 to be desirably driven at low cost.

Figure 8:
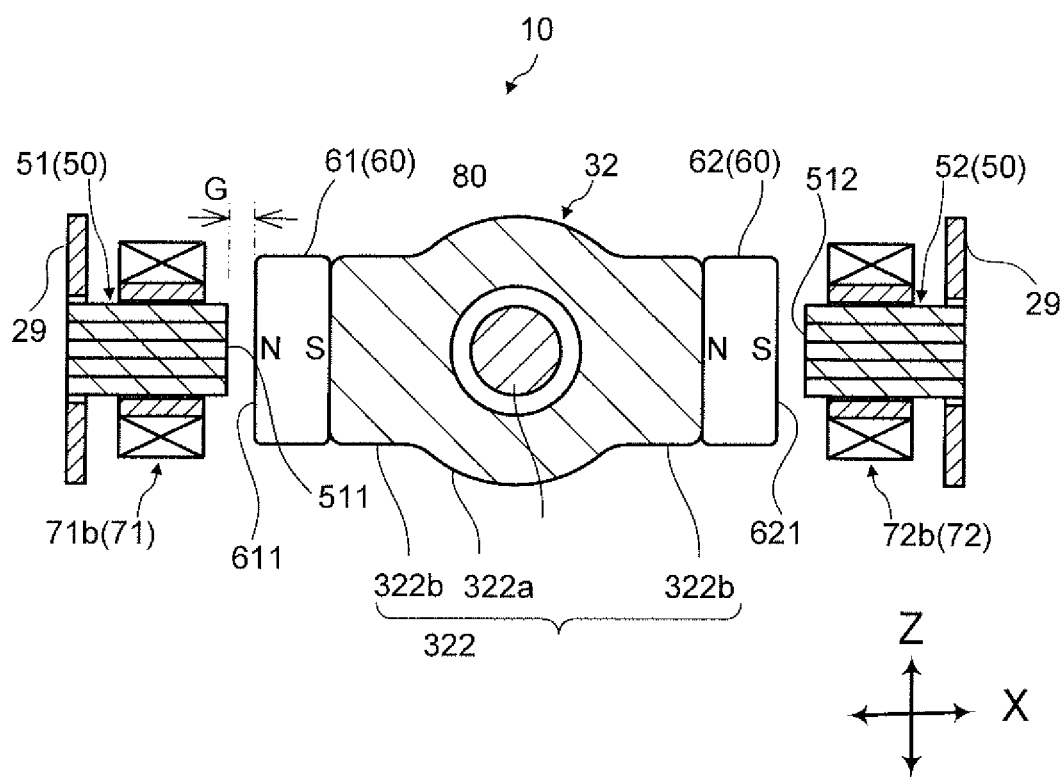
FIG. 8 is an end view taken along line A-A of FIG. 3.

FIG. 8 is an end view taken along line A-A of FIG. 3. FIG. 8 depicts, as an example, a magnetic pole combination of central coils 71b and 71b among each three coils of coil parts 71 and 72, and magnets 61 and 62 facing these coils.

As depicted in FIGS. 3, 4 and 8, magnets 61 and 62 include magnetic poles 611 and 621 as multiple magnetic poles, and are arranged to have their magnetic poles 611 and 621 allow shaft part 80 to intervene therebetween and face away from each other in a direction orthogonal to shaft part 80.

Figure 9:
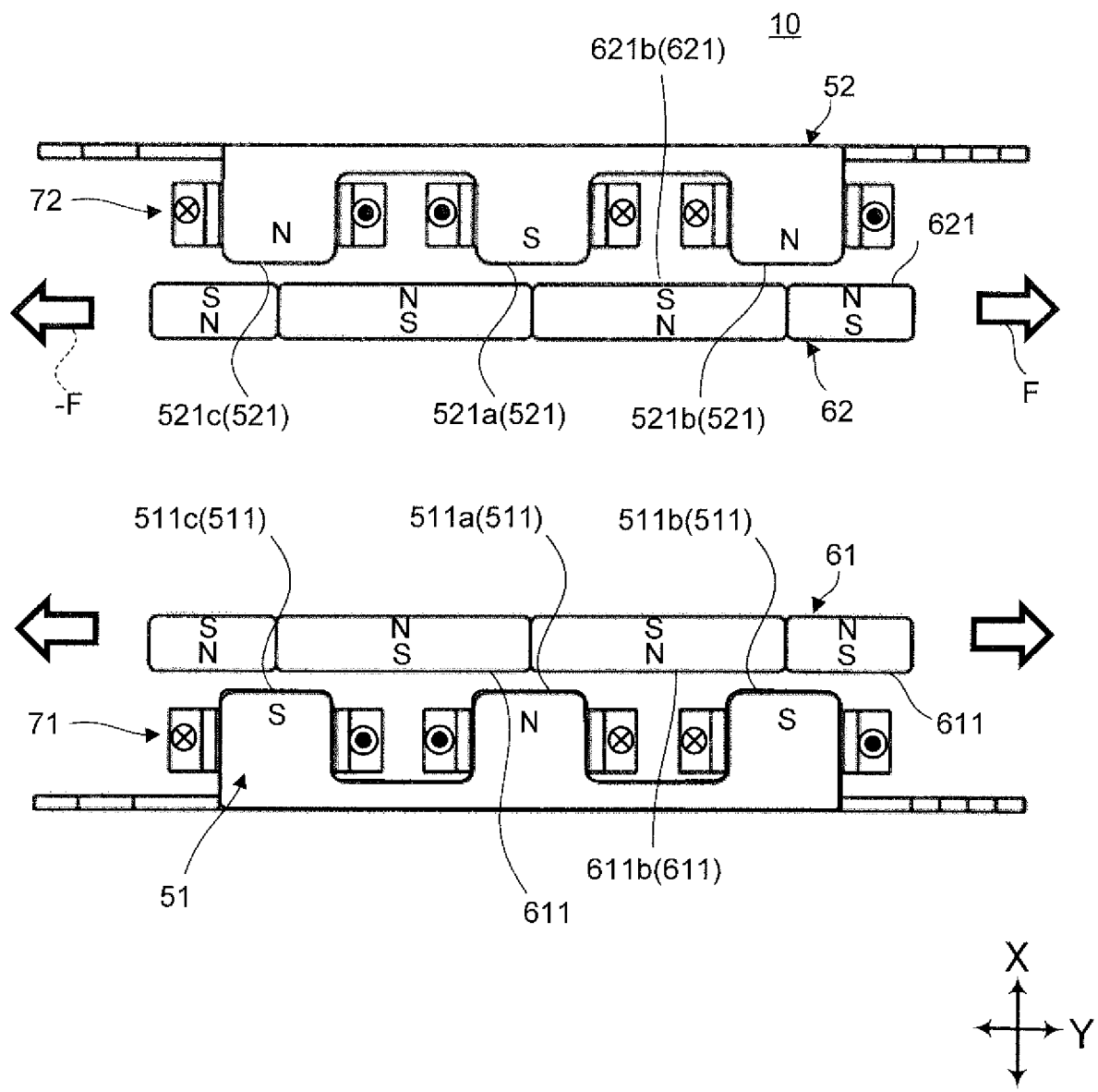
FIG. 9 is a plan view schematically depicting a magnetic circuit configuration that generates a torque in a linear direction.

In this embodiment, these magnets are fixed on the opposite side surfaces of weight part 32, into which shaft part 80 is inserted, along the longitudinal direction (Y direction), and in parallel to shaft part 80, with magnetic poles 611 and 621 being oriented toward the front and rear (X direction). In this embodiment, as for magnetic poles 611 and 621, different magnetic poles are arranged alternately in the axial direction, as depicted in FIGS. 3, 4 and 9. In this embodiment, magnetic poles 611 and 621 of magnets 61 and 62 have four different polarities arranged alternately in parallel to shaft part 80. The magnetic poles of magnets 61 and 62 are arranged to have opposite polarities, with intervention of shaft part 80, that is, to have different polarities in the X direction (see FIG. 9). The multiple magnetic poles of each of magnets 61 and 62 may be configured by alternately arranging magnets (magnet pieces) having different magnetic poles, or be achieved by magnetizing them to have alternately different magnetic poles. Likewise, magnets of each embodiment described later are analogously configured. Magnets 61 and 62 may be made of Nd sintered magnet or the like, for example.

Magnetic poles 611 and 621 of magnets 61 and 62 are arranged opposite or in parallel to each other, with predetermined gap (air gap) G being secured from core-side magnetic poles 511 and 521 of cores 51 and 52 (see FIG. 8).

In this embodiment, magnetic poles 611 and 621 are configured to have heights greater than the heights (the length in the Z direction) of opposite core-side magnetic poles 511 and 521, and are arranged such that the central positions in the height direction are substantially identical heights (a reference position in the height direction) when not being driven. Magnetic poles 611 and 621 and core-side magnetic poles 511 and 521 are configured to have areas opposite to each other as much as possible. When the magnetic circuits are driven, magnetic flux is effectively concentrated, thereby facilitating increase in output.

Positions where the polarities in the lateral direction (the axial direction; the Y direction) of magnetic poles 611 and 621 are switched, that is, the magnetic poles boundaries of magnetic poles 611 are positions facing the centers of core-side magnetic poles 511 and 521 in the lateral direction (the axial direction; the Y direction) when not being driven.

As described above, in this embodiment, cores 51 and 52, which are made of magnetic material, are arranged, with the predetermined gap (air gap) G being secured, to respectively face magnets 61 and 62, which are arranged to allow shaft part 80 to intervene therebetween. Accordingly, when not being driven, magnetic attractive forces occur between cores 51 and 52 and magnets 61 and 62. The magnetic attractive forces occur on the opposite sides of shaft part 80 and in the front and rear direction, with shaft part 80 intervening therebetween, that is, in the X direction, in the opposite directions. Accordingly, the forces cancel each other, thereby negating the inclination of movable body 30 rotating about shaft part 80. Accordingly, movable body 30 regulates the rotation about shaft part 80 (what is called rotation prevention), and is positioned at the reference position in the height direction. In this embodiment, movable body 30 is flexibly supported by metal springs 40. Accordingly, movable body 30 is flexibly supported in a manner movable in the axial direction and about the axis, by the magnetic attractive forces between cores 51 and 52 and magnets 61 and 62, what is called the magnetic springs, and by metal springs 40 (mechanical springs), with movable body 30 intervening therebetween in the axial direction. Movable body 30 may have a configuration of being flexibly supported in a manner movable in the axial direction and about the axis by the magnetic springs.

Cores 51 and 52 are excited by power supply from power supply part 25 to coil parts 71 and 72 to thereby magnetize the distal end surfaces of protrusions and form core-side magnetic poles 511 and 521, and cooperate with magnetic poles 611 and 621 of magnets 61 and 62, which are disposed opposite to each other, to cause a thrust force. Change in the direction of current supplied to coil parts 71 and 72 causes a thrust force in the opposite direction.

In this embodiment, movable body 30, which includes magnets 61 and 62, moves in a reciprocating manner (linear reciprocating vibrations) in the longitudinal direction serving as the axial direction, that is, the vibration direction. Movable body 30, which includes magnets 61 and 62, moves in the rotational direction about the axis of shaft part 80 in a reciprocating manner.

Vibration actuator 10 can linearly move movable body 30 in a reciprocating manner in the axial direction of shaft part 80, and rotationally move about the axial direction of shaft part 80 in a reciprocating manner at the same time. Vibration actuator 10 can independently achieve linear reciprocating movement, and rotational reciprocating movement. In this embodiment, vibration actuator 10 causes movable body 30 to perform the linear reciprocating movement and the rotational reciprocating movement at the same time.

FIG. 9 is a plan view schematically depicting a magnetic circuit configuration that generates a torque in a linear direction.

In this embodiment, for example, as described above, as depicted in FIG. 9, magnetic poles 611 of magnets 61 that face respective cores 51 are arranged so as to have polarities of S-pole, N-pole, S-pole, and N-pole from right to left. Magnetic poles 621 of magnet 62 facing respective cores 52 are arranged to have polarities of N-pole, S-pole, N-pole, and S-pole from right to left, that is, to have polarities different from the polarities of magnets 61 arranged in the axial direction.

As described above, magnets 61 and 62 are arranged to allow shaft part 80 (see FIGS. 3 and 8) to intervene therebetween and to face respective core-side magnetic poles 511 and 521 of cores 51 and 52 in a direction orthogonal to the axial direction, with polarities different from each other. In this embodiment, the numbers of polarities of magnets 61 and 62 and cores 51 and 52, which face each other, are magnet 4: core 3.

Magnetic pole switching positions of magnetic poles 611 and 621 of magnets 61 and 62 are positions (the reference position in the linear direction) facing the center of core-side magnetic poles 511 and 521 of cores 51 and 52 in the axial direction in a normal state (without driving).

Figure 10A:
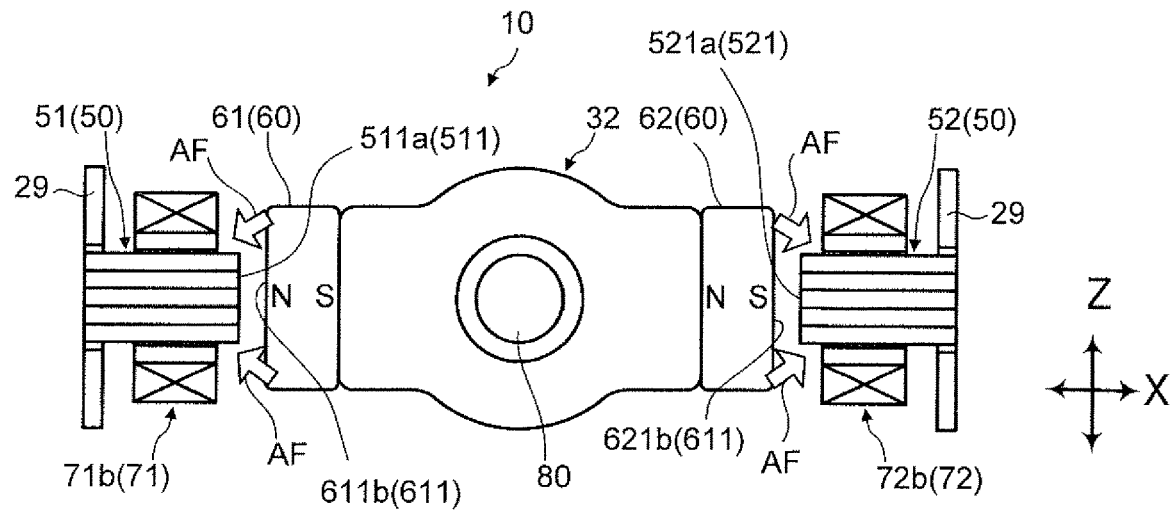
FIGS. 10A, 10B and 10C are side views schematically depicting the magnetic circuit configuration that generates the torque in the rotational direction.
Figure 10B:
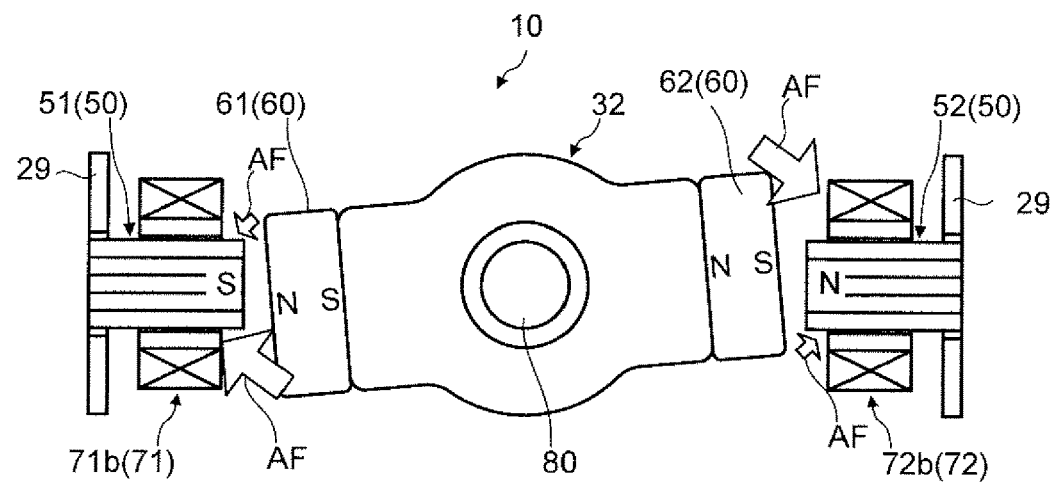
Figure 10C:
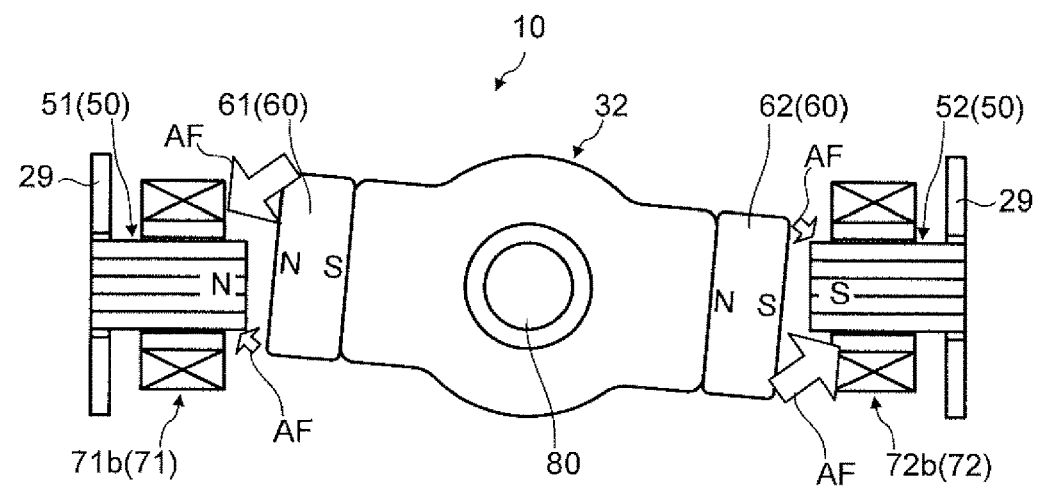

FIGS. 10A to 10C are side views schematically depicting the magnetic circuit configuration that generates the torque in the rotational direction. For the sake of convenience, FIGS. 10A to 10C depict core-side magnetic poles 511a and 521a and magnet-side magnetic poles 611b and 621b among magnetic poles 611 and 621 of magnets 61 and 62 and core-side magnetic poles 511 and 521 of cores 51 and 52 depicted in FIG. 9. Arrows AF in each diagram schematically indicate the directions and magnitudes of magnetic attractive forces that tend to return to the reference position in the rotational direction.

A magnetic circuit that includes core-side magnetic poles 511 and 521 of cores 51 and 52 and magnetic poles 611 and 621 of magnets 61 and 62 facing these core-side magnetic poles, generates an analogous thrust force between any pair of magnetic poles except only for difference in the polarities of magnets 61 and 62. The operations of the magnetic circuit is hereinafter described using core-side magnetic poles 511a and 521a and magnet-side magnetic poles 611b and 621b.

As depicted in FIG. 10A, when movable body 30 is not driven, that is, when coil parts 71 and 72 are not energized, magnets 61 and 62 of movable body 30 are positioned at the reference position in the rotational direction by the magnetic attractive forces (arrows AF) occurring between cores 51 and 52. Specifically, the center positions of magnetic poles 611 and 621 of magnets 61 and 62 and core-side magnetic poles 511 and 521 of cores 51 and 52 in the Z direction (the thickness direction; corresponding to the rotational direction) are positioned at positions facing each other in a direction orthogonal to the axial direction (X direction).

As described above, when not being driven, urging forces by metal springs 40 and attractive forces (corresponding to urging forces) by magnetic springs are applied to movable body 30. Accordingly, movable body 30 is disposed at the position movable, with the maximum amplitude, in both directions that are the left and right direction (Y direction) along shaft part 80 and a forward and reverse rotation direction (Z direction) about shaft part 80. That is, as indicated by arrows AF in FIG. 10A, when not being driven, movable body 30 tends to return to a non-driven reference position that is the reference position in the rotational direction as the center position having the same forward and reverse movement range during reciprocating movement in the forward and reverse direction, and serves as a reference when not being driven. In FIGS. 10B and 10C, the magnitudes of forces of tending to return to the reference position in the rotational direction when the energization direction is switched in the case of movement in the forward and reverse direction are indicated by arrows AF that are larger than arrows indicating magnetic attractive forces when not being driven.

Coil parts 71 and 72 are then energized. Here, as depicted in FIG. 9, current is supplied to coil parts 71 and 72 to excite cores 51 and 52, and excite core-side magnetic pole 511a at the center-positioned protrusion (hereinafter, for the sake of convenience, "center protrusion") of core 51 facing magnet 61 to the N-pole, and excite core-side magnetic pole 521a at the center protrusion of core 52 facing magnet 62 to S-pole. By the energization, the polarities of core-side magnetic poles 511b, 511c, 521b and 521c at protrusions (side protrusions) on both sides of the central protrusions in cores 51 and 52, with the central protrusions intervening therebetween, assume polarities different from the polarities of the central protrusions (corresponding to FIG. 10C). For example, in FIG. 9, core-side magnetic poles 511b and 511c at the side protrusions have S-pole, and core-side magnetic poles 521b and 521c at the side protrusions have N-pole.

Accordingly, magnetic poles 611b and 621b of magnet 61 depicted in FIG. 9 repel core-side magnetic poles 511a and 521a at the central protrusions of cores 51 and 52, and are attracted by core-side magnetic poles 511b and 521b at the side protrusions to obtain thrust forces in F directions, thereby moving in the F direction.

As described above, the magnetic attractive forces and repulsive forces caused between magnetic poles 611 and 621 of magnets 61 and 62 and core-side magnetic poles 511 and 521 of cores 51 and 52 by energization to coil parts 71 and 72, cause the thrust forces in one way along the axial direction (for example, the thrust force in the F direction) against the urging forces of metal springs 40. Accordingly, magnets 61 and 62 are driven in the F direction along the axial direction.

When magnetic poles 611b and 621b of magnets 61 and 62 repel core-side magnetic poles 511a and 521a of cores 51 and 52 and tend to move in the thrust F direction from the reference position in the rotational direction, the torque in the rotational direction about the axis (for example, see FIG. 6) occurs at metal springs 40 to which loads in the thrust F direction, that is, the axial direction are applied.

Furthermore, in addition to the urging forces of metal springs 40, torque components in the rotational direction provided by magnetic attractive forces occurring between magnetic poles 611 and 621 of magnets 61 and 62 and core-side magnetic poles 511 and 521 of cores 51 and 52 are added.

Accordingly, core-side magnetic poles 511b and 521b attracting each other rotate, that is, are rotationally driven so as to be twisted along the F direction, while moving in the F direction.

The energization direction to coil parts 71 and 72 are reversed, and power is supplied to coil parts 71 and 72. When power supply is thus switched, the magnetic attractive forces between magnetic poles 611 and 621 of magnets 61 and 62 and core-side magnetic poles 511 and 521 of cores 51 and 52 and the urging forces of metal springs 40, and the polarities of core-side magnetic poles 511 and 521 of cores 51 and 52 are changed, thereby allowing movable body 30 to move in the thrust F direction while rotating in a direction different from the movement in the F direction (corresponding to FIG. 10B). That is, movable body 30 moves so as to be twisted in the direction reversed from that of the movement in the thrust F direction.

That is, in vibration actuator 10, core-side magnetic poles 511 and 521 of cores 51 and 52 (in detail, the magnetic poles on the distal end surfaces of protrusions) are excited with AC waves input from power supply part 25 into coil parts 71 and 72. The excitation effectively causes the magnetic attractive forces and repulsive forces at magnets 61 and 62 of movable body 30. Accordingly, magnets 61 and 62 of movable body 30 move in a reciprocating manner along the longitudinal direction with reference to positions (here, in a plan view, positions at which the centers of magnets 61 and 62 in the longitudinal direction (axial direction) respectively overlap the centers of core-side magnetic poles 511 and 521 of cores 51 and 52 facing thereto, and the centers of magnets 61 and 62 in the height direction respectively overlap the centers of core-side magnetic poles 511 and 521 of cores 51 and 52 in the height direction) serving as drive reference positions. That is, movable body 30 moves with respect to stationary body 20 in a reciprocating manner in the direction along the magnetic poles 611, 621, 511 and 521 of magnets 61 and 62 and cores 51 and 52, and in the rotational direction about the axis (see FIGS. 9 and 10A, 10B and 10C).

The drive principle is described below. The drive principle of vibration actuator 10 in this embodiment is achieved by any of all vibration actuators 10 and 10A in the following embodiments.

As for the vibrations at vibration actuator 10 in this embodiment in the direction of shaft part 80, the mass m [kg] of movable body 30 and the spring constant $K_{sp}$ in the torsion direction are assumed, and movable body 30 vibrates with respect to stationary body 20 at resonant frequency $f_r$ [Hz] calculated by following expression 1.

[Expression 1]

$$f_r = \frac{1}{2\pi}\sqrt{\frac{K_{sp}}{m}} \quad (1)$$

In vibration actuator 10 in this embodiment, alternate current at a frequency substantially identical to resonant frequency $f_r$ of movable body 30 is supplied from power supply part 25 to coil parts 71 and 72, thereby exciting cores 51 and 52 (in detail, core-side magnetic poles 511 and 521) via coil parts 71 and 72. Accordingly, movable body 30 can be effectively driven.

Movable body 30 in this vibration actuator 10 is in a state of being supported by a spring-mass system structure of support by stationary body 20 via the magnetic springs by cores 51 and 52, around which respective coil parts 71 and 72 are wound, and magnets 61 and 62, and metal springs 40. Consequently, when coil parts 71 and 72 are supplied with alternate current at a frequency identical to resonant frequency $f_r$ of movable body 30, movable body 30 is driven in a resonant state.

An equation of motion and a circuit equation that indicate the drive principle of vibration actuator 10 along the axial direction are described below. Vibration actuator 10 performs driving, based on the equation of motion indicated by following expression 2 and the circuit equation indicated by following expression 3.

[Expression 2]

$$m\frac{d^2X(t)}{dt^2} = K_f i(t) - K_{sp}x(t) - D\frac{dx(t)}{dt} \quad (2)$$

$m$: mass [kg]

$x(t)$: displacement [m]

$K_f$: thrust constant [N/A]

$i(t)$: current [A]

$K_{sp}$: spring constant [N/m]

$D$: attenuation coefficient [N/(m/s)]

[Expression 3]

$$e(t) = Ri(t) + L\frac{di(t)}{dt} + K_e\frac{dx(t)}{dt} \quad (3)$$

$e(t)$: voltage [V]

$R$: resistance [Ω]

$L$: inductance [H]

$K_e$: back electromotive force constant [V/(m/s)]

That is, the mass m [Kg], displacement x(t) [m], thrust constant $K_f$ [N/A], current i(t) [A], spring constant $K_{sp}$ [N/m], attenuation coefficient D [N/(m/s)] and the like in vibration actuator 10 can be appropriately changed in a range satisfying expression 2. The voltage e(t) [V], resistance R [Ω], inductance L [H], and back electromotive force constant $K_e$ [V/(m/s)] can be appropriately changed in a range satisfying expression 3.

As described above, when vibration actuator 10 performs driving at resonant frequency $f_r$ determined by the mass m of movable body 30 and spring constant $K_{sp}$ where metal springs (elastic bodies; coil springs in this embodiment) 40 and magnetic springs are superimposed, a large output pertaining to vibrations along shaft part 80 can be effectively obtained.

The drive principle of vibration actuator 10 in the rotational direction is simply described. In vibration actuator 10 in this embodiment, provided that the moment of inertia of movable body 30 is J [kg·m²] and the spring constant of metal springs 40 and magnetic springs in the torsion direction is $K_{sp\_rot}$, movable body 30 vibrates with respect to stationary body 20 at resonant frequency $f_{r\_rot}$ [Hz] calculated by following expression 4.

[Expression 4]

$$f_{r\_rot} = \frac{1}{2\pi}\sqrt{\frac{K_{sp\_rot}}{J}} \quad (4)$$

Movable body 30 constitutes a mass part in a spring-mass system vibration model. Accordingly, when AC waves at a frequency identical to resonant frequency $f_{r\_rot}$ of movable body 30 are input into coil 11, movable body 30 comes into a resonant state. That is, AC waves at a frequency substantially identical to resonant frequency $f_{r\_rot}$ of movable body 30 are input from power supply part (for example, power supply part 25; power supply part 25A described later) into coil parts 71 and 72, thereby allowing movable body 30 to vibrate effectively.

The equation of motion indicating the drive principle of vibration actuator 10 in the rotational direction is following expression 5. Movable body 30 in vibration actuator 10 is moved in the rotational direction by driving based on following expression 5 and the circuit equation of expression 3 described above.

[Expression 5]

$$J\frac{d^2\theta(t)}{dt^2} = K_t i(t) - K_{sp\_rot}\theta(t) - D_{rot}\frac{d\theta(t)}{dt^2} \quad (5)$$

$J$: moment of inertia [kgm²]

$\theta(t)$: degree [rad]

$K_t$: torque constant [Nm/A]

$i(t)$: current [A]

$K_{sp\_rot}$: spring constant [Nm/rad]

$D_{rot}$: attenuation coefficient [Nm/(rad/s)]

That is, the moment of inertia J [kg·m²] of movable body 30 in vibration actuator 10, angle of rotation θ(t) [rad], torque constant $K_t$ [N·m/A], current i(t)[A], spring constant $K_{sp\_rot}$ [N·m/rad], attenuation coefficient $D_{rot}$ [N·m/(rad/s)] and the like can be appropriately changed within a range satisfying expression 5. The voltage e(t) [V], resistance R [Ω], inductance L [H], and back electromotive force constant $K_e$ [V/(m/s)] can be appropriately changed in a range satisfying expression 3.

As described above, in vibration actuator 10, when coil parts 71 and 72 are energized by AC waves corresponding to resonant frequency $f_{r\_rot}$ determined by the moment of inertia J of movable body 30 and the spring constant $K_{sp\_rot}$ of spring part, a large vibration output can be effectively obtained.

Figure 11:
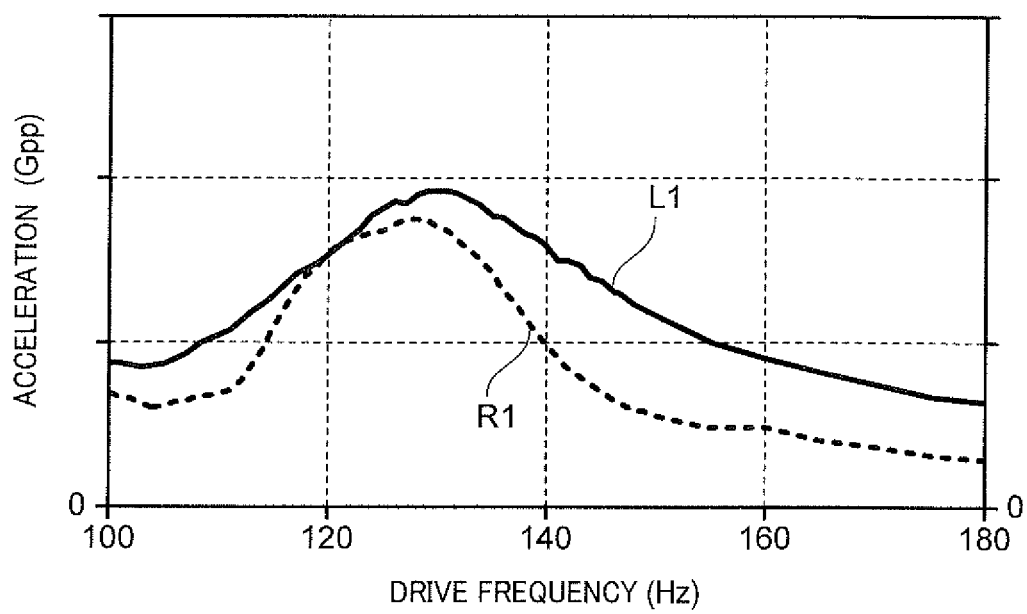
FIG. 11 depicts the resonant frequency that generates the torque in the rotational direction and the torque in the linear direction.

FIG. 11 depicts resonant frequency R1 in a case where resonant frequency L1 for generating vibrations along the axial direction, that is, vibrations in the linear direction, and the resonant frequency for generating vibrations about the axis, that is, vibrations in the rotational direction are substantially identical to each other, to perform vibrations along the axial direction and vibrations about the axis at the same time.

Coil parts 71 and 72 are driven by a drive signal having a principal component of a single frequency obtained by making resonant frequency L in the linear direction and resonant frequency R in the rotational direction depicted in FIG. 11 substantially identical to each other.

That is, coil parts 71 and 72 are energized by the resonant frequency containing both the components of vibrations along the axial direction and vibrations about the axis.

Accordingly, as described above, a drive circuit that can cause movable body 30 to move in the axial direction of shaft part 80 in a reciprocating manner and move around the axis in a reciprocating manner at the same manner can be easily configured. According to this drive circuit, the reciprocating movement in the axial direction of shaft part 80 and reciprocating movement about the axis can be easily performed at the same time. Accordingly, vibrations in two directions that are the linear direction and the rotational direction can be achieved, which can improve a vibration feeling of the user.

Figure 12:
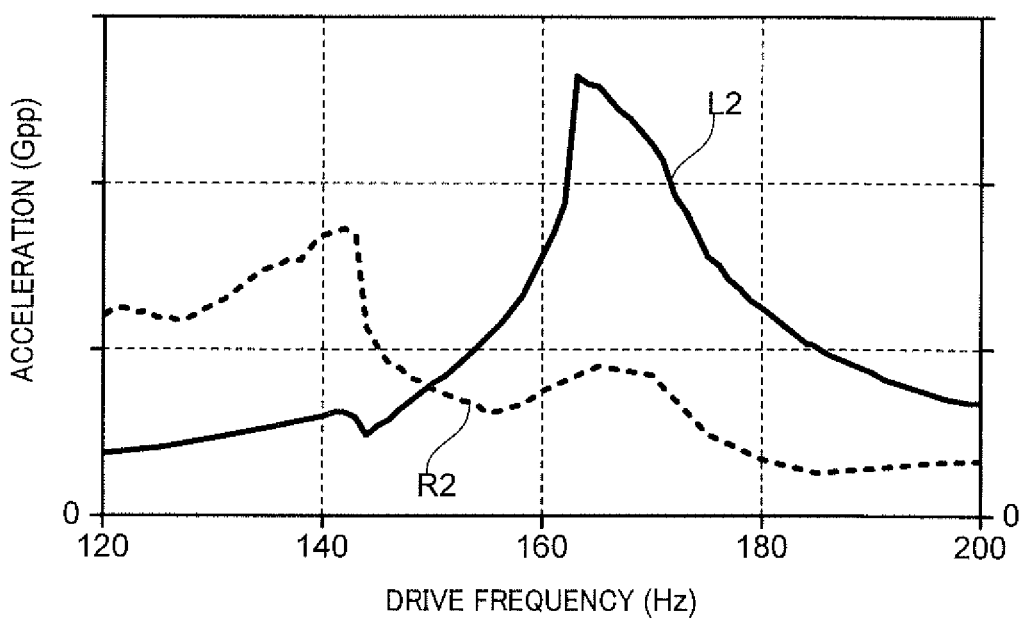
FIG. 12 depicts the resonant frequency that generates the torque in the rotational direction and the torque in the linear direction.

FIG. 12 depicts a drive signal where resonant frequencies of vibrations along the axial direction and vibrations around the axis are different frequencies.

That is, FIG. 12 depicts drive frequency L2 in the linear direction, and drive frequency R2 in the rotational direction that is different from that in the linear direction.

The drive frequency in the linear direction, and the drive frequency in the rotational direction that is different from that in the linear direction are superimposed in the drive signal, which is input into coil parts 71 and 72, thereby allowing vibrations with different frequencies in two directions to be generated at the same timing. Accordingly, movable body 30 can be driven in wide frequencies, and the number of vibration representations can be increased.

According to vibration actuator 10, this vibration actuator 10 vibrates movable body 30 in the axial direction through cooperation between coil parts 71 and 72 and magnets 61 and 62.

Vibration actuator 10 includes: stationary body 20 that includes coil parts 71 and 72; and movable body 30 that is supported movably in the axial direction via shaft part 80 with respect to stationary body 20, and includes magnets 61 and 62. Magnets 61 and 62 are provided for movable body 30 so as to have magnetic poles in different directions, with shaft part 80 intervening therebetween. Coil parts 71 and 72 are arranged at stationary body 20 so as to face respective magnets 61 and 62 provided for movable body 30, with predetermined gap G being secured therebetween.

According to this configuration, magnetic attractive forces occurring between cores 51 and 52, around which respective coil parts 71 and 72 are wound, and magnets 61 and 62, with shaft part 80 intervening therebetween, are applied to movable body 30 in different directions, with shaft part 80 intervening therebetween. Accordingly, the movement of movable body 30 in the rotational direction by the magnetic attractive forces is regulated, and movable body 30 is held at a neutral position when movable body 30 rotationally moves in a reciprocating manner, thereby allowing the maximum amplitude during rotational oscillating movement to be secured. Oscillating movement in the axial direction is also allowed. Consequently, reduction in thickness can be achieved.

Vibrations in the two directions that are linear and rotational directions can provide a vibration feeling having improved feeling. Consequently, sufficient vibrations can be favorably applied while facilitating reduction in size.

Conventionally, in a case of a vibration actuator using a resonance phenomenon, with a linear spring constant (constant value), the characteristics for frequencies are steep characteristics around a resonance point. Accordingly, it has been known that when the conventional vibration actuator is driven with a fixed frequency, deviation of resonance increases variation in vibration characteristics. On the contrary, vibration actuator 10 in this embodiment uses the magnetic springs including magnets 61 and 62 and coil parts 71 and 72. In comparison with characteristics in the case of the linear frequency characteristics, flat drive frequencies can be allowed, the vibration output can unlikely be variable, and a desired vibration output can be obtained.

In addition to metal springs 40, the magnetic springs including cores 51 and 52 and magnets 61 and 62, which are made of magnetic material, are included. Accordingly, the spring constants of metal springs 40, which elastically support cores 51 and 52 at the reference positions, can be reduced. This reduction can improve the lifespan of metal springs 40, and facilitate improvement of reliability of vibration actuator 10.

Incidentally, in a case of attaching a conventionally planar- or cylindrical-shaped actuator to a mobile electronic apparatus, such as a mobile phone, a smartphone, a wearable terminal, or a ring-shaped device (for example, Φ 15 to 25 mm), a large vibration device is required to generate vibrations for providing a sufficient feeling for a wearing user. Furthermore, vibration characteristics of a stable vibration output without variation are required.

On the contrary, according to vibration actuator 10 in this embodiment, movable body 30 can generate vibrations by moving in a reciprocating manner in two axes so as to linearly move along shaft part 80 in a reciprocating manner and to rotationally move about shaft part 80 in a reciprocating manner at the same time, thereby allowing a sufficient vibration feeling to be provided. Accordingly, in a case where vibration actuator 10 is mounted on a ring-shaped device, even a downsized vibration actuator 10 can effectively provide the user with sufficient vibrations without variation.

Weight part 32 of movable body 30 is formed of tungsten, which has a high specific gravity. Accordingly, increase in the mass of the movable body itself can, in turn, increase the vibration output.

According to vibration actuator 10, even if the clearance with movable body 30 is small in the housing, assembly can be achieved without interference. The trajectory of movable body 30 becomes stable, which facilitates design, and can stably drive movable body 30. In the case where coil springs are adopted as metal springs 40, the configuration allows shaft part 80 to be inserted through coil springs at their center. Consequently, assembly characteristics can be improved, and stable holding by spring can be achieved.

In Embodiments 1 and 2, the numbers of polarities facing each other are magnet 4: core 3. The ratio of the numbers of facing poles may be magnets: cores=2:3, or 3:2.

Embodiment 2

Figure 13:
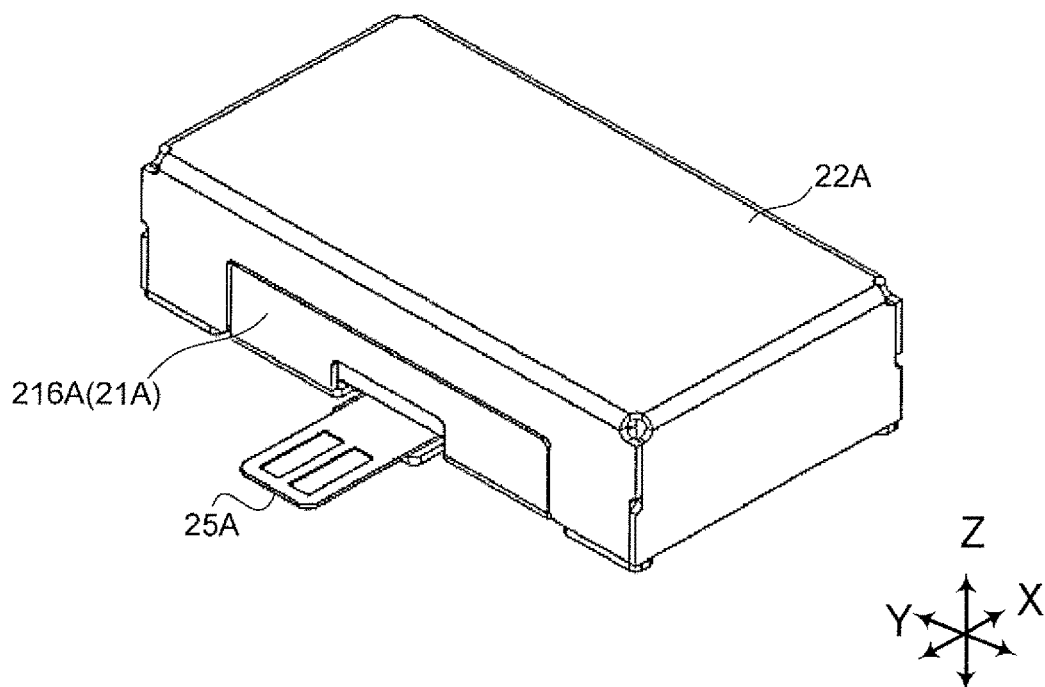
FIG. 13 is an appearance perspective view of a vibration actuator of Embodiment 2 according to the present invention.
Figure 14:
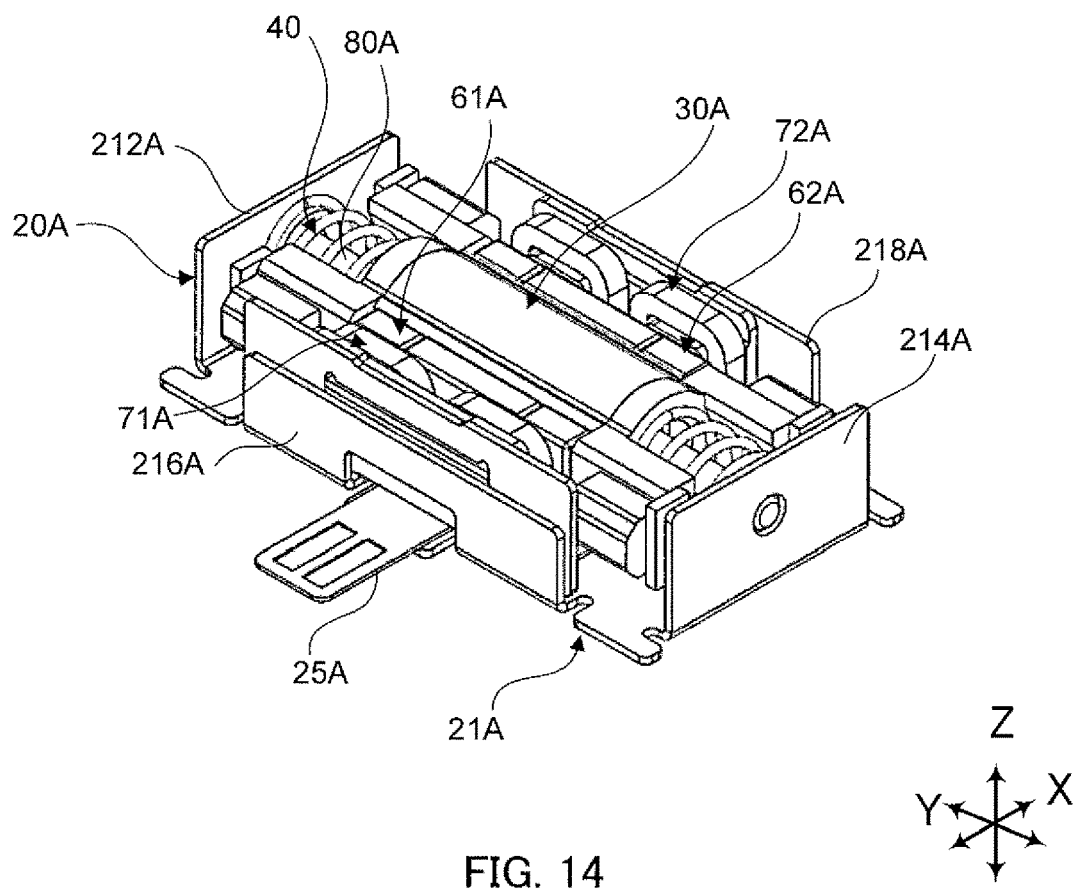
FIG. 14 is a perspective view depicting an internal configuration of the vibration actuator of Embodiment 2 according to the present invention.
Figure 15:
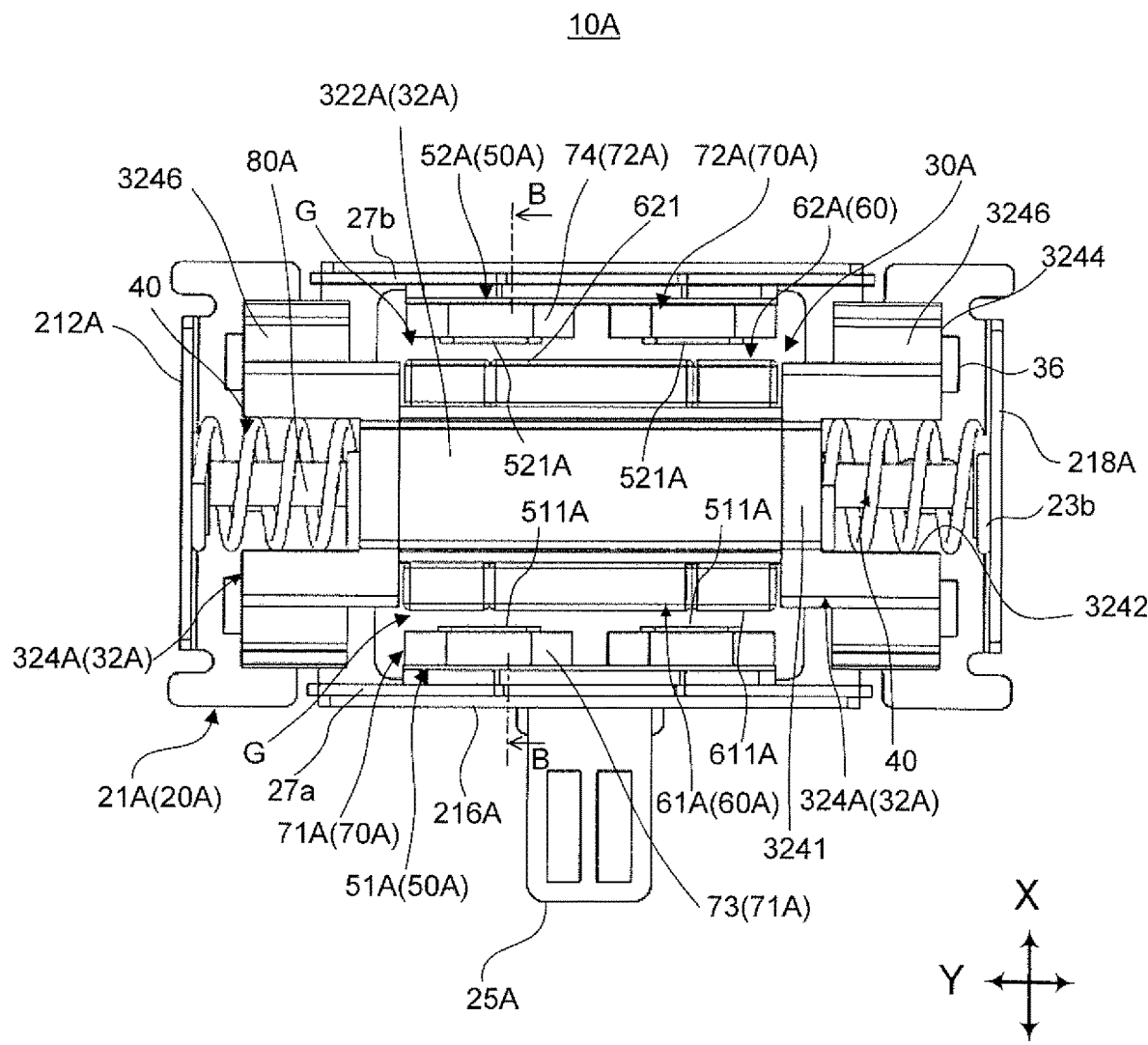
FIG. 15 is a plan view depicting the internal configuration of the vibration actuator.
Figure 16:
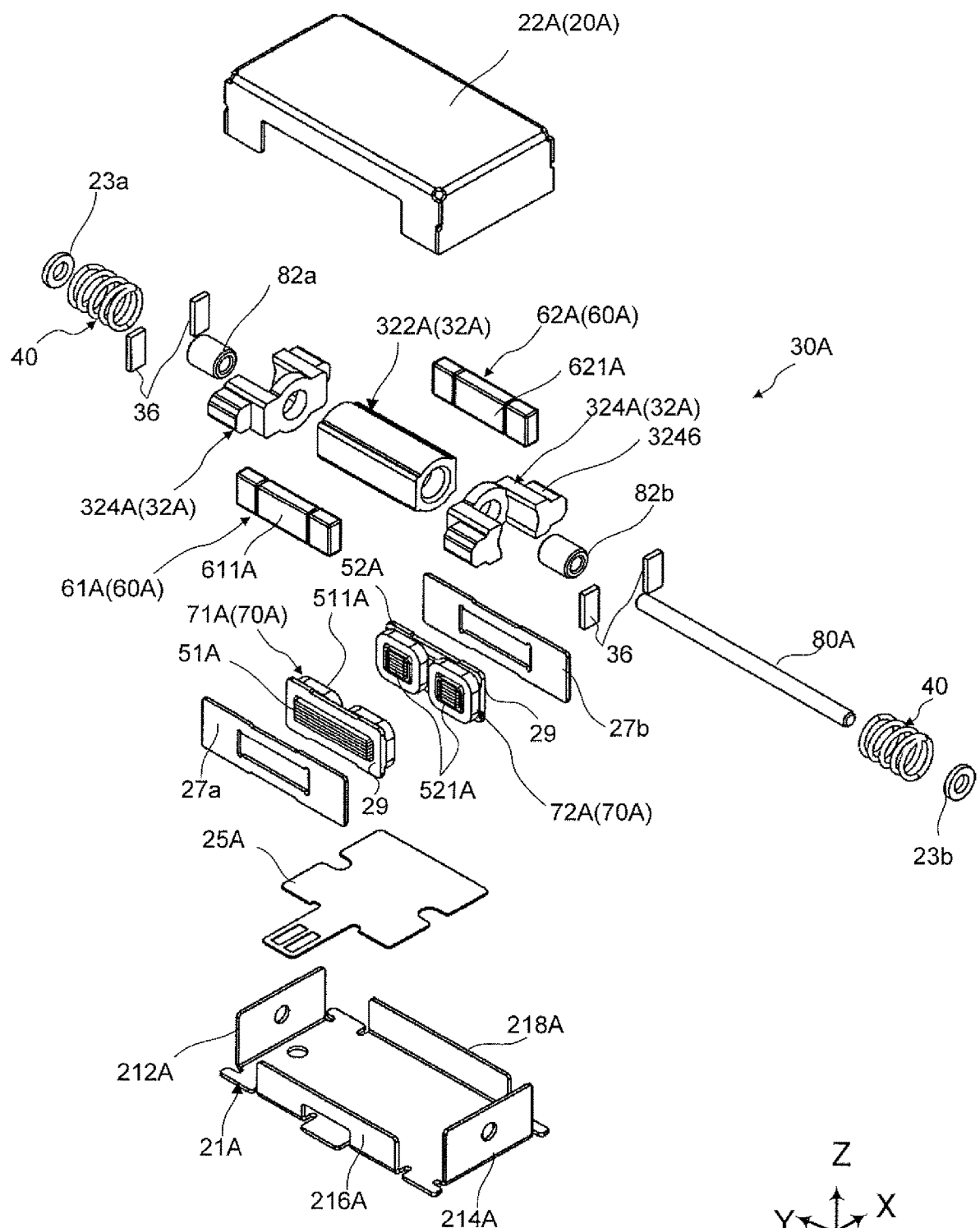
FIG. 16 is an exploded perspective view of the vibration actuator.
Figure 17:
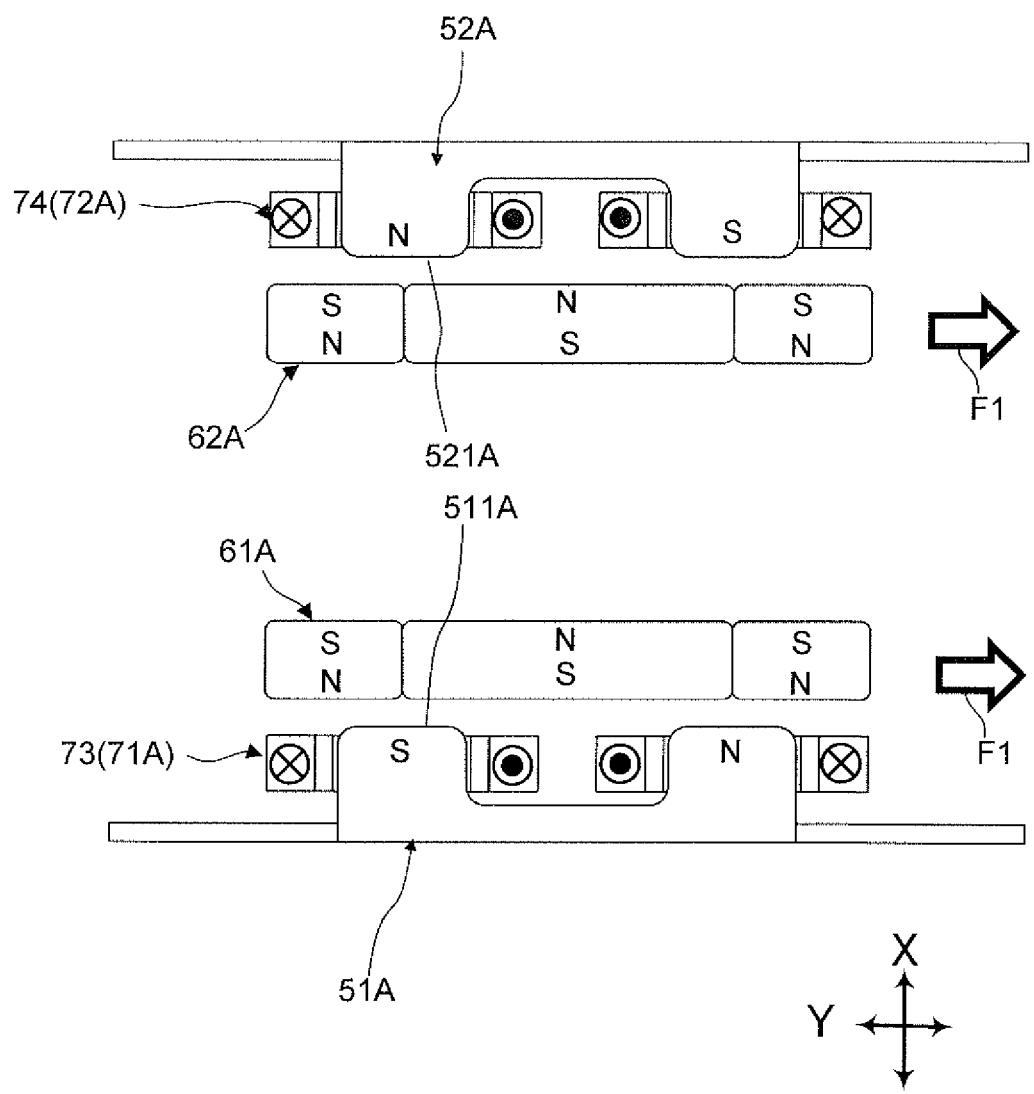
FIG. 17 is a plan view schematically depicting a magnetic circuit configuration that generates a torque in a linear direction.
Figure 18:
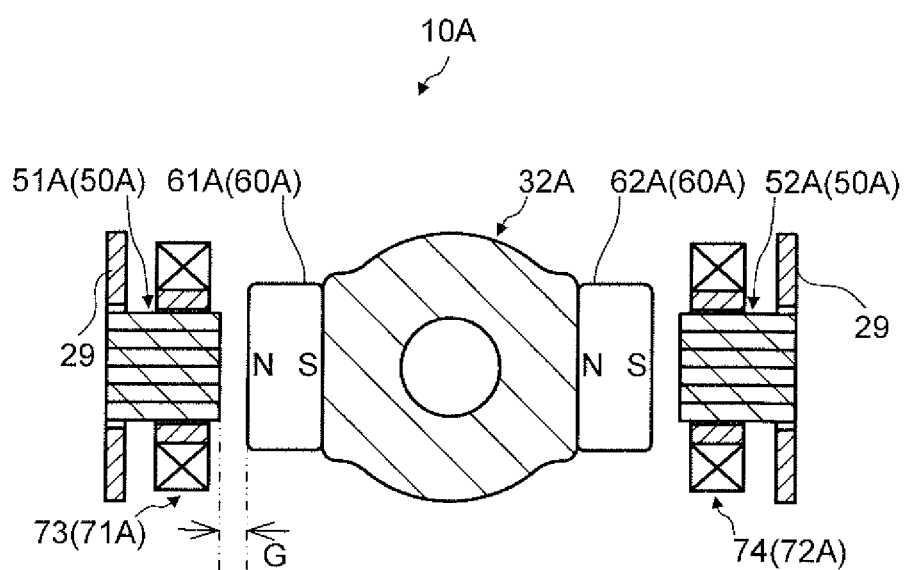
FIG. 18 is a sectional view taken along line B-B of FIG. 15 depicting the magnetic circuit configuration of the vibration actuator.
Figure 19A:
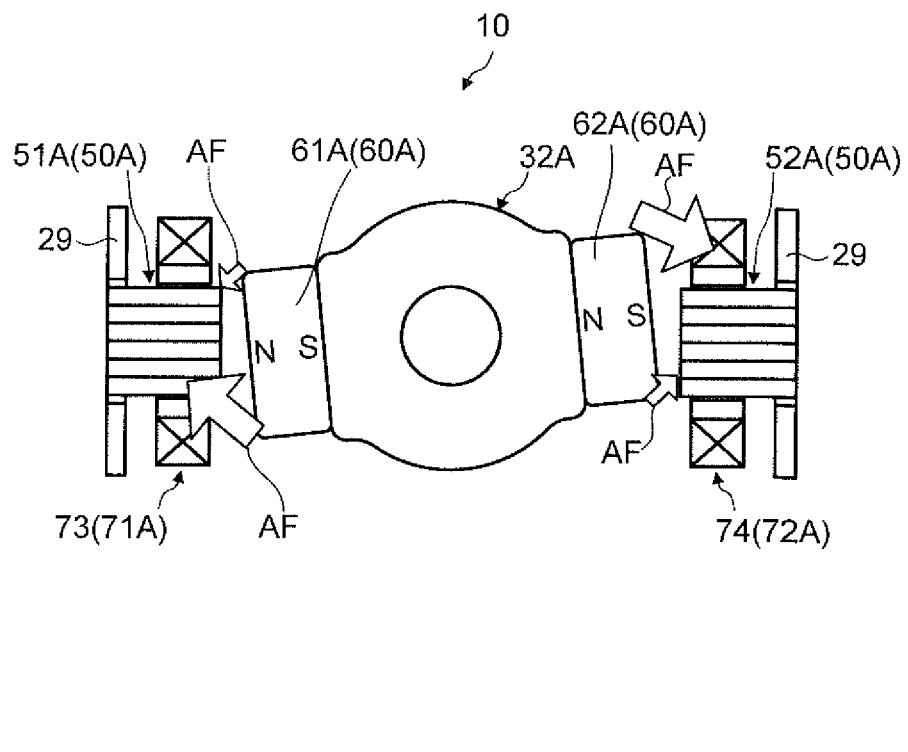
FIGS. 19A and 19B are side views schematically depicting the magnetic circuit configuration that generates the torque in the rotational direction.
Figure 19B:
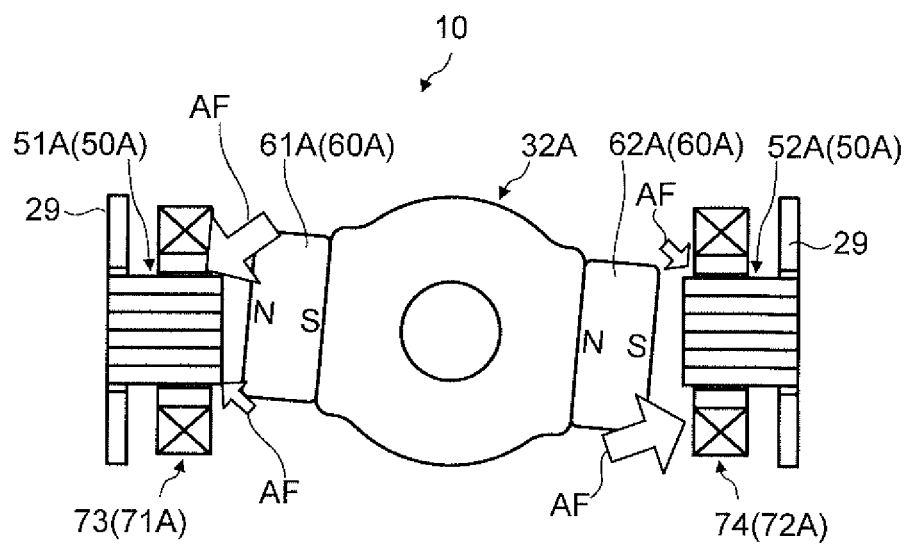

FIG. 13 is an appearance diagram of a configuration of a vibration actuator of Embodiment 2 according to the present invention. FIG. 14 is a perspective view depicting the internal configuration of the vibration actuator. FIG. 15 is a plan view depicting the internal configuration of the vibration actuator. FIG. 16 is an exploded perspective view of the vibration actuator. FIG. 17 is a plan view schematically depicting a magnetic circuit configuration that generates a torque in a linear direction. FIG. 18 is a sectional view taken along line B-B of FIG. 15. FIG. 18 depicts, as an example, single coils 73 and 74 among the coils in coil parts 71A and 72A, and magnetic poles of magnets that face the respective coils. FIGS. 19A and 19B are side views schematically depicting the magnetic circuit configuration that generates the torque in the rotational direction. Arrows AF in FIGS. 19A and 19B schematically indicate the directions and magnitudes of magnetic attractive forces that tend to return to the reference position in the rotational direction.

Vibration actuator 10A in Embodiment 2 has a basic configuration analogous to that of vibration actuator 10 corresponding to Embodiment 1 described with reference to FIGS. 1 to 10A, 10B and 10C. However, the number of magnetic poles of magnets 61A and 62A and the number of magnetic poles of cores 51A and 52A are different. In vibration actuator 10A in this embodiment, the numbers of magnetic poles of magnets and cores are 3:2. As for the other configuration points, vibration actuator 10A in this embodiment has a configuration analogous to that of vibration actuator 10. Consequently, configuration elements having functions analogous to those of configuration elements of vibration actuator 10 are indicated by assigning "A" to the same names and same symbols. Detailed description thereof is omitted.

Vibration actuator 10A has a configuration where the numbers of magnetic poles of magnets 61A and 62A provided on both the sides of movable body 30A are each three, and the numbers of magnetic poles of cores 51A and 52A of stationary body 20A that face magnets 61A and 62A are each two.

Vibration actuator 10A depicted in FIG. 13 has a planar shape with a height (in the Z direction, corresponding to the thickness) shorter than the lengths in the narrow side direction (the X direction; the front and rear direction) and lateral direction (the Y direction; the left and right direction).

As shown in FIGS. 13 to 15, vibration actuator 10A in this embodiment includes: stationary body 20; shaft part 80A; and movable body 30A movably supported with respect to stationary body 20A via shaft part 80A provided across shaft fixation walls 212A and 214A of stationary body 20A. As with shaft fixation walls 212 and 214 of stationary body 20, shaft fixation walls 212A and 214A are provided from sides apart from each other in the lateral direction (Y direction) among four sides of the bottom main body of base 21A. Core fixation walls 216A and 218A are provided from sides apart from each other in the front and rear direction (X direction) among the four sides. Cores 51A and 52A are fixed along core fixation walls 216A and 218A.

Movable body 30A includes magnets 60A (61A and 62A). Movable body 30A linearly moves in the reciprocating manner along the axial direction of shaft part 80A and rotationally moves in the reciprocating manner about shaft part 80A, through cooperation between magnets 60A and coil parts 70A (71A and 72A) that are provided for stationary body 20A and are wound around cores 50A (51A and 52A).

In vibration actuator 10A in this embodiment, on the opposite side parts of weight part 32A (see FIG. 15) that functions as a main body of a movable body along axial direction in movable body 30A, respective magnets 61A and 62A, with shaft part 80A intervening therebetween, are provided. At positions facing magnets 61A and 62A, cores 51A and 52A (see FIGS. 15 and 16) around which coil parts 71A and 72A (indicated as coils 73 and 74 included in respective coil parts 71A and 72A in FIG. 15) are wound, are respectively provided.

Magnets 61A and 62A and cores 51A and 52A are arranged such that their magnetic poles (magnetic poles 611A and 621A of magnets 61A and 62A and core-side magnetic poles 511A and 521A of cores 51A and 52A) face each other, with a predetermined gap (air gap) G intervening therebetween.

Specifically, magnetic poles 611A and 621A of magnets 61A and 62A are arranged facing away from each other in a direction orthogonal to the extending direction of shaft part 80A (front and rear directions; opposite in the X direction).

Cores 51A and 52A include multiple protrusions around which coil parts 71A and 72A are wound. Energization of coil parts 71A and 72A (coils 73 and 74 in FIG. 15) excites the distal end surfaces of the protrusions as core-side magnetic poles 511A and 521A.

Core-side magnetic poles 511A and 521A are arranged to face magnetic poles 611A and 621A of magnets 61A and 62A. Coil parts 71A and 72A, cores 51A and 52A and magnets 61A and 62A constitute a magnetic force generation part. The magnetic force generation part functions as magnetic springs provided by magnetic attractive forces on the opposite sides (the X direction; the front and rear direction) of shaft part 80A. The magnetic attractive forces occur symmetrically with respect to shaft part 80A, with shaft part 80A intervening therebetween.

Movable body 30A is attracted toward the opposite sides by the magnetic attractive forces caused on the opposite sides, and the forces are cancelled to achieve balance. Consequently, movable body 30A is prevented from rotating, and is held at a position that achieves a horizontal state and serves as a reference position.

As with vibration actuator 10, vibration actuator 10A includes not only magnetic springs, but also metal springs 40 that elastically support movable body 30A in a manner returnable to the reference position when moving in the axial direction of shaft part 80A. By the magnetic springs and metal springs 40, movable body 30A is elastically supported in a manner reciprocating about the axis and in the axial direction in a state of restricting rotation about the axis and the movement in the axial direction.

The movement of movable body 30A provided by the magnetic circuit in vibration actuator 10A is analogous to that of vibration actuator 10.

Energization of coil parts 71A and 72A excites core-side magnetic poles 511A and 521A of cores 51A and 52A. Accordingly, as depicted in FIG. 17, magnetic attractive forces and magnetic repulsive forces occurring between the different polarities arranged in the axial direction at magnetic poles 611A and 621A of magnets 61A and 62A facing each other, cause the thrust force F1, and movable body 30A moves in the thrust force F1 direction along shaft part 80A. At the same time of linear movement along this shaft part 80A, as depicted in FIG. 18, movable body 30A positioned at the operation reference position is moved in the occurrence direction of the torque in the rotational direction by the torque in the rotational direction generated by metal springs 40 as depicted in FIG. 19A.

By changing the energization direction to coil parts 71A and 72A, that is, by changing the current supply direction to the reverse direction, the polarities of core-side magnetic poles 511A and 521A of cores 51A and 52A are changed to polarities different from the polarities described above, thereby changing the movement direction of movable body 30A to the −F1 direction. Movable body 30A moves in −F1 direction while simultaneously rotating about shaft part 80A in the reverse direction of the rotational direction described above. By repeating the movement and the rotation, magnets 60A of movable body 30A move in Y direction (F1 direction and −F1 direction) in a reciprocating manner, while rotationally move about shaft part 80A in a reciprocating manner, with reference to the position serving as the drive reference position. The drive principle is a drive principle analogous to that of vibration actuator 10 in Embodiment 1 achieved by expressions 1 to 5 described above.

Movable body 30A moves in a manner twisting clockwise and counterclockwise along shaft part 80A, and vibrates by moving in two directions that are the extending direction of shaft part and the direction around shaft part 80A in a reciprocating manner.

Vibration actuator 10A can exert an advantageous effect analogous to advantageous effect 1 of vibration actuator 10 described above. In addition, in this Embodiment 2, at cores 51A and 52A around which coil parts 71A and 72A are wound, core-side magnetic poles 511A and 521A excited by energizing coil parts 71A and 72A are each two poles. Magnets 61A and 62A facing them each have three magnetic poles 611A and 621A. Accordingly, in comparison with vibration actuator 10, vibration actuator 10A can be made as a vibration actuator having a small external shape.

In this embodiment, metal springs 40 serving as a rotational direction torque generating source are cylindrical coil springs. To generate more strong torque in the rotational direction, movable bodies 30 and 30A in the embodiments may be movable body 30B depicted in FIGS. 20 and 21.

Figure 20:
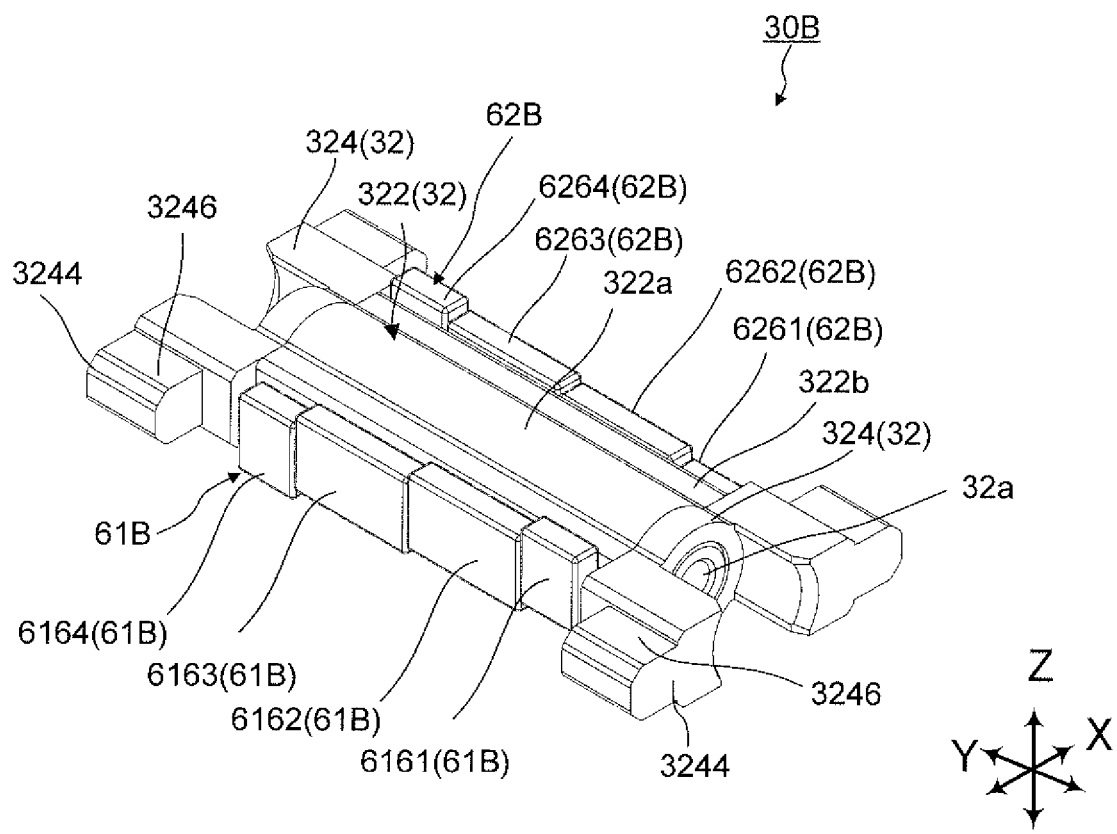
FIG. 20 is a perspective view depicting a modification example of a movable body.
Figure 21:
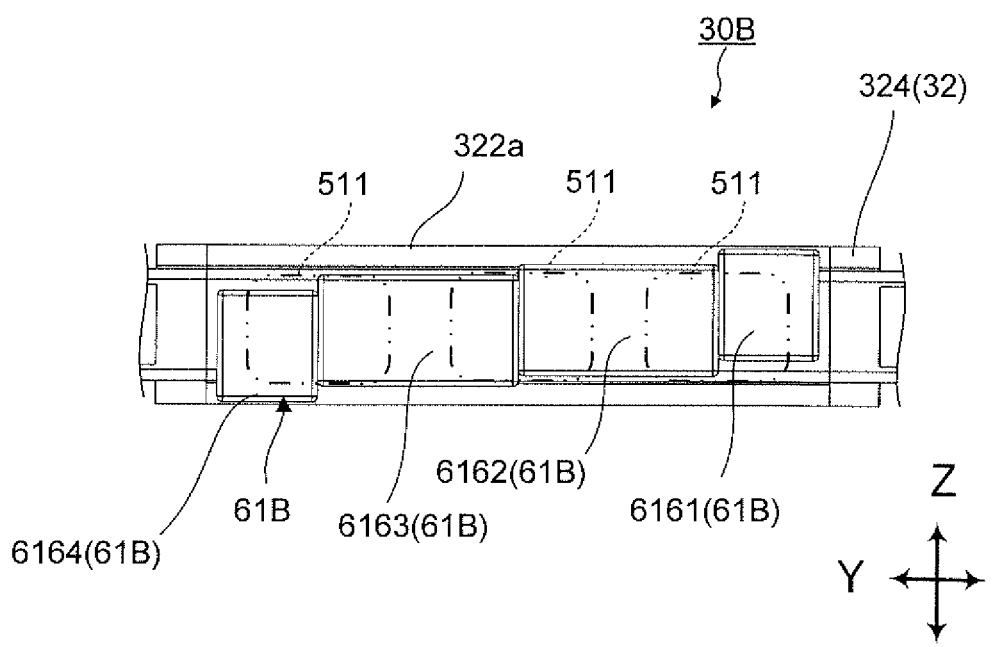
FIG. 21 illustrates a position relationship between magnets and cores of the movable body depicted in FIG. 20.

FIG. 20 is a perspective view depicting a modification example of a movable body. FIG. 21 illustrates a position relationship between magnets and cores of the movable body depicted in FIG. 20.

As for the configuration of movable body 30, in movable body 30B depicted in FIG. 20, magnets 61 and 62 are replaced with magnets 61B and 62B. Other configuration points are analogous to those of movable body 30, and exert working effects analogous to those of movable body 30. Accordingly, the same configuration elements are assigned the same symbols and names; description thereof is omitted.

In movable body 30B, the magnets (magnets 61B and 62B) are provided with protrusions partially protruding in the rotational direction (here, Z direction). A configuration is thus achieved that magnetically generates the torque in the rotational direction in cooperation with magnetic poles (see FIGS. 10A, 10B and 10C) of cores 51 and 52 excited by energization of coil parts 71 and 72.

That is, in movable body 30B, magnets 61B arranged to allow through-hole 32a, into which a shaft part is inserted, to intervene in the X direction have a shape where magnetic poles 6161 to 6164 and 6261 to 6264 arranged to right and left from the center in the axial direction among the magnetic poles arranged along the extending direction of through-hole 32a protrude in the Z direction in a stepwise manner. Specifically, magnetic poles 6161 to 6164 are arranged in a descending stepwise manner in one direction (to the left in FIGS. 20 and 21). Magnetic poles 6261 to 6264 are arranged in an ascending stepwise manner in the one direction (to the left in FIGS. 20 and 21) that is the direction in which the stepwise shape of magnetic poles 6161 to 6164 descends.

As depicted in FIG. 21, magnetic poles 6161 to 6164 are arranged such that with respect to core-side magnetic poles 511 of core 51 arranged substantially linear in the axial direction, magnetic poles 6162 and 6161 on the right side from the center in the diagram of FIG. 21 sequentially protrude upward. Magnetic poles 6163 and 6164 on the left side from the center in the diagram of FIG. 21 are arranged sequentially downward. Magnetic poles 6261 to 6264 of magnet 62B disposed opposite to magnet 61A, with through-hole 32a intervening therebetween, are arranged in an ascending stepwise manner in the one direction in a manner opposite to that of magnetic poles 6161 to 6164.

Accordingly, in magnets 61B and 62B of movable body 30B, when cores 51 and 52 (see FIG. 3) are energized, a torque in the rotational direction occurs between magnets 61B and 62B and core-side magnetic poles 511 and 521 of cores 51 and 52 (see FIG. 3), and movable body 30B rotationally vibrates in a reciprocating manner in the torsion direction about the shaft part.

According to the modification example of this embodiment, in the layout of magnets 61B and 62B of movable body 30B, protrusions or protruding magnetic poles 6161 to 6164 and 6261 to 6264 are provided in the rotational direction (here, the Z direction that is the up-down direction).

Accordingly, according to the configuration where movable body 30B in the modification example is replaced with movable body 30 in vibration actuator 10, a torque is further generated magnetically, which can largely move movable body 30B in the rotational direction, serving as a drive source in the rotational direction. Even in a case where the amplitude is limited only with forces of cylindrical coil springs 40 (see FIG. 3) serving as a torque generating source, a vibration feeling can be clearly provided for the user.

Embodiment 3

Figure 22:
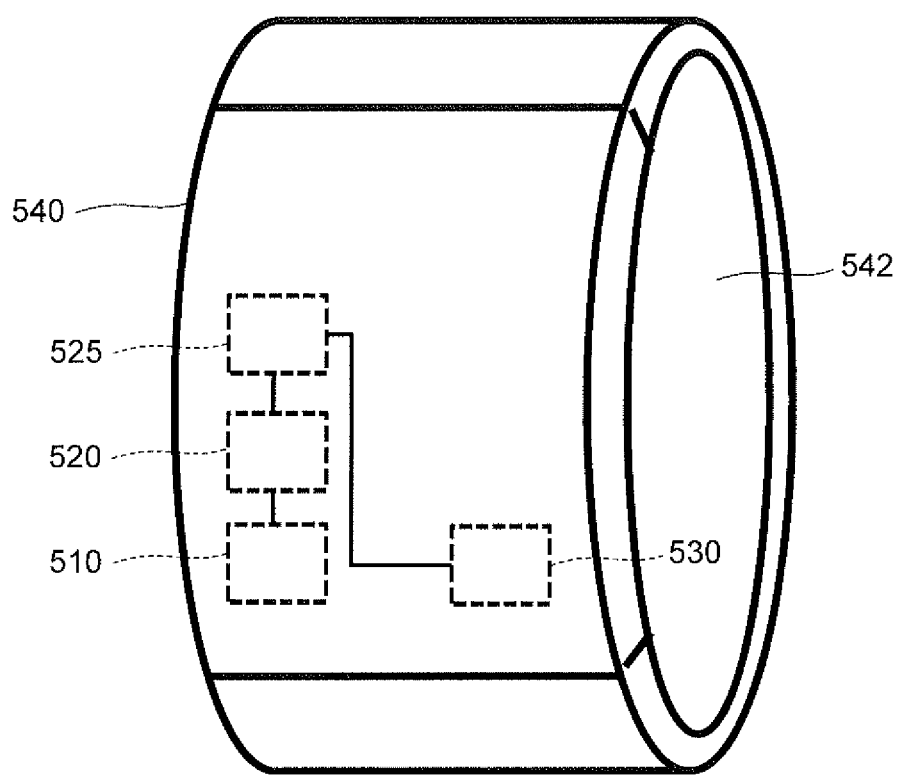
FIG. 22 depicts an example of an embodiment of a vibration actuator.

FIG. 22 schematically depicts a main part configuration of wearable terminal 500 of Embodiment 4 according to the present invention. Wearable terminal 500 is used by being worn by the user. Here, wearable terminal 500 functions as what is called a wearable input device that issues, to the wearing user, an notification about an incoming call from a connected communication terminal through vibrations.

Wearable terminal 500 depicted in FIG. 22 includes communication apparatus 510, processing apparatus 520, vibration actuator 530 as a drive apparatus, and housing 540. Any of vibration actuators 10 and 10A depicted in Embodiments 1 to 3 is applied to vibration actuator 530. The bottom surface of vibration actuator 530 is disposed close to inner peripheral surface 542 in housing 540. Wearable terminal 500 is provided with any of vibration actuators 10 and 10A described in Embodiments 1 and 2.

Housing 540 is formed to have a ring shape, and is worn around a finger of the user. At this time, the bottom surface of vibration actuator 530 is disposed so as to be overlaid on the finger that is a wearing part. Accordingly, vibration actuator 530 is worn so as to be in close contact with the finger. Communication apparatus 510 is connected to a wireless communication terminal, such as a mobile phone, a smartphone, or a mobile game machine, not depicted, through wireless communication, for example, receives a signal from a wireless communication terminal, and outputs the signal to processing apparatus 520.

For example, as for communication apparatus 510, a signal from the wireless communication terminal is an incoming call or the like of the wireless communication terminal, the call being received according to a communication scheme, such as Bluetooth (R) or the like, for example. Processing apparatus 520 converts the input signal into a drive signal for vibration actuator 530, and supplies the signal to the power supply part of vibration actuator 530 (10, 10A) (power supply part 25, 25A of vibration actuator 10, 10A) via drive circuit part 525, thereby driving vibration actuator 530.

Accordingly, movable body (30, 30A, 30B) vibrates to vibrate wearable terminal 500. Housing 540 of wearable terminal 500 has a ring shape. Movable body (30, 30A, 30B) vibrates in a reciprocating manner along the bottom surface of vibration actuator 530 (corresponding to the bottom surface of base 21), and vibrates in a reciprocating manner in a direction intersecting with the bottom surface, thereby allowing the vibrations to be transmitted directly to the finger. Accordingly, user feeling vibrations can be further improved, with a predetermined magnitude, without changing the external shape, in comparison with a configuration where the vibration actuator is disposed on the back of a finger or at a position apart from a finger pulp, for example, a non-contact position.

The shape of wearable terminal 500 can be reduced in size, and can facilitate to improve usability with no uncomfortable feeling during use. Wearable terminal 500 may be an incoming call notification function device that includes communication apparatus 510, processing apparatus 520, and vibration actuator 530 as a drive apparatus. Accordingly, the incoming function device may have a configuration that drives the vibration actuator to notify the user of an incoming call obtained from the outside by a wireless communication terminal, such as a mobile phone, a smartphone, or a mobile game machine. In addition to an incoming call, vibrations of vibration actuator 530 may be augmented to include feeling vibrations provided for the user such as vibrations in response to input of a signal from an external apparatus to an information communication terminal, for example email, and vibrations in response to an operation for a game. This wearable terminal 500 may be provided with a function that can input characters or numerals into a wirelessly connected apparatus only by movement of drawing characters in the air, and can select information displayed on a connected display device, such as a display.

Figure 23:
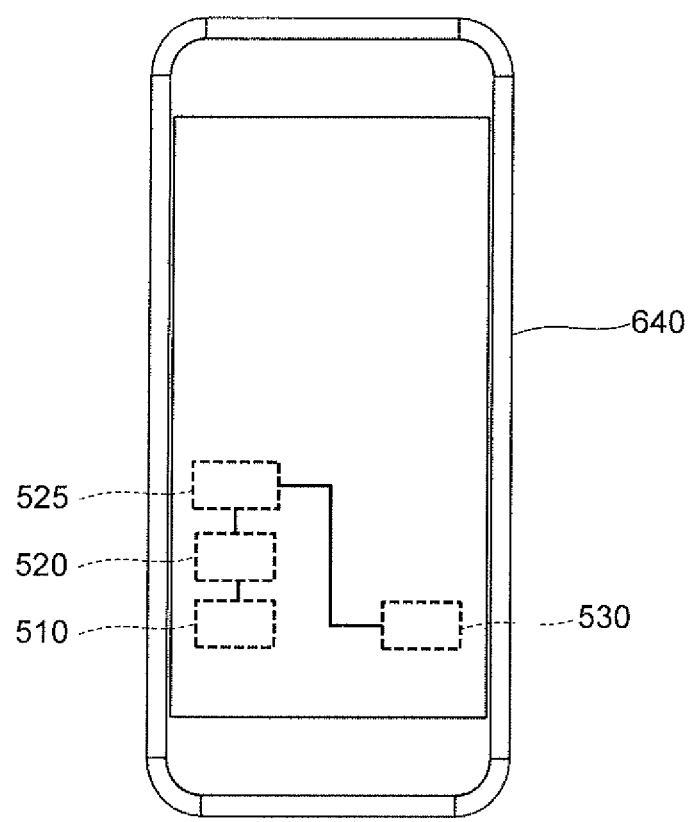
FIG. 23 depicts an example of an embodiment of a vibration actuator.

As depicted in FIG. 23, analogous advantageous effects can be exerted only by mounting, on mobile terminal 600, actuator 530 to which any of vibration actuators 10 and 10A described in Embodiments 1 and 2 is applied. As with wearable terminal 500, mobile terminal 600 includes communication apparatus 510, processing apparatus 520, drive circuit part 525, and vibration actuator 530 as a drive apparatus, in housing 640. In mobile terminal 600, an incoming call obtained from the outside by a wireless communication terminal, such as a mobile phone, a smartphone, or a mobile game terminal, can be notified to the user by vibrating vibration actuator 530, and additionally, signals of the functions of mobile terminal 600 can be processed by processing apparatus 520, and vibration actuator 530 is vibrated via drive circuit part 525, thus allowing a notification to be issued to the user.

A configuration may be adopted where movable body 30A in vibration actuator 10A in Embodiment 2 is replaced with movable body 30B. The number of magnetic poles excited by coils and the number of magnetic poles of magnets are not limited to those in the embodiments described above. The ratio of the number of core-side magnetic poles and the number of magnet-side magnetic poles may be the number of core-side magnetic poles: the number of core-side magnetic poles +1, or the number of core-side magnetic poles: the number of core-side magnetic poles −1, and preferably one of the number of core-side magnetic poles and the number of magnet-side magnetic poles is two or more.

It should be construed that the embodiments disclosed here are only examples in all aspects, and are not limited. The scope of the present invention is indicated not by the above description but by the accompanying claims, and is intended to include meaning equivalent to that of the scope of claims, and all modifications in the scope. The embodiments of the present invention have thus been described above. The above description is only examples of the preferred embodiments of the present invention. The scope of the present invention is not limited thereto. That is, description of the configuration of the apparatus and the shape of each element is only examples. It is a matter of course that various modifications and addition may be applied to these examples in the scope of the invention.

INDUSTRIAL APPLICABILITY

The vibration actuator according to the present invention has advantageous effects of reduction in size and preferably and effectively vibrating, and is useful as a game apparatus, a wearable terminal communicable with an information communication terminal, and a mobile electronic apparatus such as an incoming call notification function device that notifies a user of an incoming call from an information communication terminal, such as a mobile phone, through the user's feeling.

REFERENCE SIGNS LIST

10, 10A, 530 Vibration actuator
20, 20A Stationary body
21, 21A Base
22, 22A Cover
23a, 23b Spring holder
25, 25A Power supply part
27a, 27b Stiffener
29 Bobbin part
30, 30A, 30B Movable body
32, 32A Weight part
32a Through-hole
36 Cushion material
40 Metal spring
50, 50A, 51, 51A, 52, 52A Core
60, 60A, 61, 61A, 61B, 62, 62A, 62B Magnet
70, 70A, 71, 71A, 72, 72A Coil part
71b, 72b, 73, 74 Coil
80, 80A Shaft part
82a, 82b Bearing
212, 214, 212A, 214A Shaft fixation wall
216, 218, 216A, 218A Core fixation wall
322 Trunk part
322a Cylindrical part
322b Linear protrusion part
324 Extension part
510 Communication apparatus
511, 511A, 511a, 511b, 511c, 521, 521A, 521a, 521b Core-side magnetic pole
520 Processing apparatus
525 Drive circuit part
530 Actuator
540, 640 Housing
542 Inner peripheral surface
600 Mobile terminal 611, 611A, 611b, 621, 621A, 621b, 6161, 6162, 6163, 6164, 6261, 6262, 6263, 6264 Magnetic pole (magnet-side magnetic pole)
3221 Insertion hole
3241 Extension main part
3242 Receiver part
3244 Extension portion
3246 Relief portion
3241a Opening

What is claimed is:

1. A vibration actuator that cooperates with a coil and a magnet to vibrate a movable body with respect to a stationary body, the vibration actuator comprising:
    the stationary body including the coil and a core around which the coil is wound;
    a shaft part; and
    the movable body including the magnet, the movable body being movably supported by the stationary body via the shaft part,
    wherein the core is disposed along an axial direction of the shaft part and includes a core-side magnetic pole to be excited by energization to the coil,
    the magnet includes a magnet-side magnetic pole disposed so as to face the core-side magnetic pole with a gap therebetween, and
    the vibration actuator further comprises a spring part elastically supporting the movable body with respect to the stationary body, linearly movably in the axial direction in a reciprocating manner, and rotationally movably about an axis in a reciprocating manner,
    wherein, in the movable body, opposite side parts positioned such that the shaft part is placed therebetween and extending in the axial direction are configured to have a thicknesses in a rotational direction thinner than a part into which the shaft part is inserted.

2. The vibration actuator according to claim 1, wherein the spring part includes:
    a magnetic spring provided by a magnetic attractive force occurring between the core-side magnetic pole and the magnet-side magnetic pole; and
    a metal spring disposed so as to urge the movable body in the axial direction between the movable body and the stationary body.

3. The vibration actuator according to claim 2, wherein the metal spring is a cylindrical coil spring that is provided around the shaft part, between the stationary body and the movable body, and generates a torque in a winding direction of the coil along with movement of the movable body in the axial direction by energization to the coil.

4. The vibration actuator according to claim 3, wherein the cylindrical coil spring is fixedly joined to one of the stationary body and the movable body, the stationary body and the movable body being connected to an end of at least one of opposite ends of the cylindrical coil spring which are connected to both the stationary body and the movable body.

5. The vibration actuator according to claim 3, wherein in the cylindrical coil spring, at least one of opposite ends of the cylindrical coil spring which are connected to the stationary body and the movable body is provided with a planar portion that is in planar contact with one of the stationary body and the movable body.

6. The vibration actuator according to claim 1, wherein the magnet-side magnetic pole is disposed to protrude partly in a rotational direction and generates a torque in the rotational direction in cooperation with the core-side magnetic pole excited by the energized coil.

7. The vibration actuator according to claim 1, wherein the coil is driven by a drive signal at a single frequency where a resonant frequency at which the movable body is linearly moved in a reciprocating manner, and a resonant frequency at which the movable body is rotationally moved in a reciprocating manner are substantially identical to each other.

8. The vibration actuator according to claim 1, wherein the coil is driven by an input drive signal, a frequency of the drive signal being a superimposition of a drive frequency at which the movable body is linearly moved in a reciprocating manner, and a drive frequency at which the movable body is rotationally moved in a reciprocating manner different from a linear direction.

9. The vibration actuator according to claim 1, wherein the movable body contains a high specific gravity metal material.

10. A mobile electronic apparatus provided with the vibration actuator according to claim 1.

* * * * *